United States Patent
Imada et al.

(10) Patent No.: US 7,254,318 B2
(45) Date of Patent: Aug. 7, 2007

(54) RECORDING APPARATUS, RECORDING PROGRAM, AND RECORDING METHOD

(75) Inventors: Masayuki Imada, Hiroshima (JP); Ryuichi Hori, Hiroshima (JP); Masahiro Horie, Kuga-gun (JP); Masahiro Kawasaki, Hiroshima (JP); Toru Suetomo, Higashihiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1094 days.

(21) Appl. No.: 10/304,755

(22) Filed: Nov. 27, 2002

(65) Prior Publication Data

US 2003/0099460 A1 May 29, 2003

(30) Foreign Application Priority Data

Nov. 29, 2001 (JP) ............................ 2001-364087
Feb. 13, 2002 (JP) ............................ 2002-035989

(51) Int. Cl.
*H04N 7/26* (2006.01)

(52) U.S. Cl. ..................... 386/112; 386/109; 386/124

(58) Field of Classification Search ................. 386/27, 386/33, 40, 45, 46, 52, 105, 106, 111, 112, 386/124, 125; 360/32; 725/91, 92, 114, 725/115, 120, 134; 382/234–239; 348/397.1, 348/426, 399.1, 444, 425.1, 425.3; 345/725
See application file for complete search history.

(56) References Cited

U.S. PATENT DOCUMENTS 5,950,164 A 9/1999 Takahashi
6,304,714 B1 * 10/2001 Krause et al. ................ 386/52
6,441,754 B1 * 8/2002 Wang et al. .................. 341/50
6,459,850 B1 * 10/2002 Bruls .......................... 386/109
6,532,593 B1 * 3/2003 Moroney ..................... 725/142
6,584,272 B1 * 6/2003 Fukushima et al. ........... 386/46
6,968,007 B2 * 11/2005 Barrau .................... 375/240.14
7,136,573 B2 * 11/2006 Kikuchi et al. ............... 386/83
2002/0041754 A1 4/2002 Kikuchi et al.

FOREIGN PATENT DOCUMENTS

| EP | 0 977 200 | 2/2000 |
|---|---|---|
| JP | 8-191427 | 7/1996 |
| JP | 9-284715 | 10/1997 |
| JP | 2001-258009 | 9/2001 |
| JP | 2002-109831 | 4/2002 |

* cited by examiner

*Primary Examiner*—Thai Q. Tran
*Assistant Examiner*—Mishawn Dunn
(74) *Attorney, Agent, or Firm*—Wenderoth, Lind & Ponack, L.L.P.

(57) ABSTRACT

Disclosed is a recording apparatus for recording a plurality of audio-visual contents stored in a HD to a writable DVD. A drive controller copies at least one of the contents stored in the HD to the DVD. If the available capacity of the DVD left after the copying falls short to copy a remaining content, the remaining content is re-encoded prior to being recorded in the DVD. The bit rate to be allocated to the remaining content upon re-encoding is calculated from the available capacity of the DVD and the reproduction time of the remaining content to be re-encoded.

14 Claims, 29 Drawing Sheets

FIG.2A

```
┌─────────────────────────────────────────────────────────┐
│                         BACKUP                          │
│ ┌─────────────────────────────────────────────────────┐ │
│ │ CONTENT1  2002  11/ 3  CH3  PM8:00~PM8:45  NORMAL IMAGE QUALITY │ │
│ ├─────────────────────────────────────────────────────┤ │
│ │ CONTENT2  2002  11/10  CH3  PM8:00~PM8:45  NORMAL IMAGE QUALITY │ │
│ ├─────────────────────────────────────────────────────┤ │
│ │ CONTENT3  2002  11/17  CH3  PM8:00~PM8:45  NORMAL IMAGE QUALITY │ │
│ ├─────────────────────────────────────────────────────┤ │
│ │ CONTENT4  2002  11/18  CH5  PM7:00~PM7:30  NORMAL IMAGE QUALITY │ │
│ ├─────────────────────────────────────────────────────┤ │
│ │ CONTENT5  2002  11/19  CH6  PM6:00~PM6:30  NORMAL IMAGE QUALITY │ │
│ └─────────────────────────────────────────────────────┘ │
│  [↑][↓] : SELECT   [ENTER] : ENTER SELECTED CONTENT     │
└─────────────────────────────────────────────────────────┘
```

FIG.2B

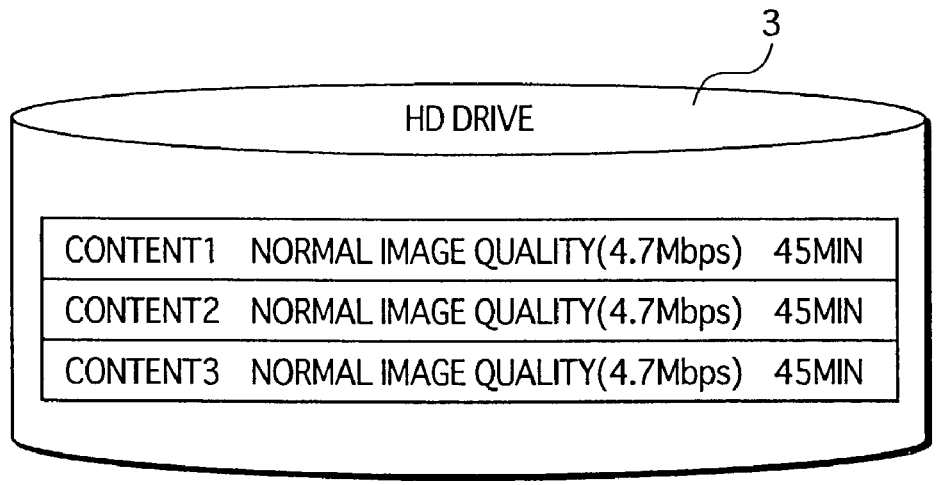

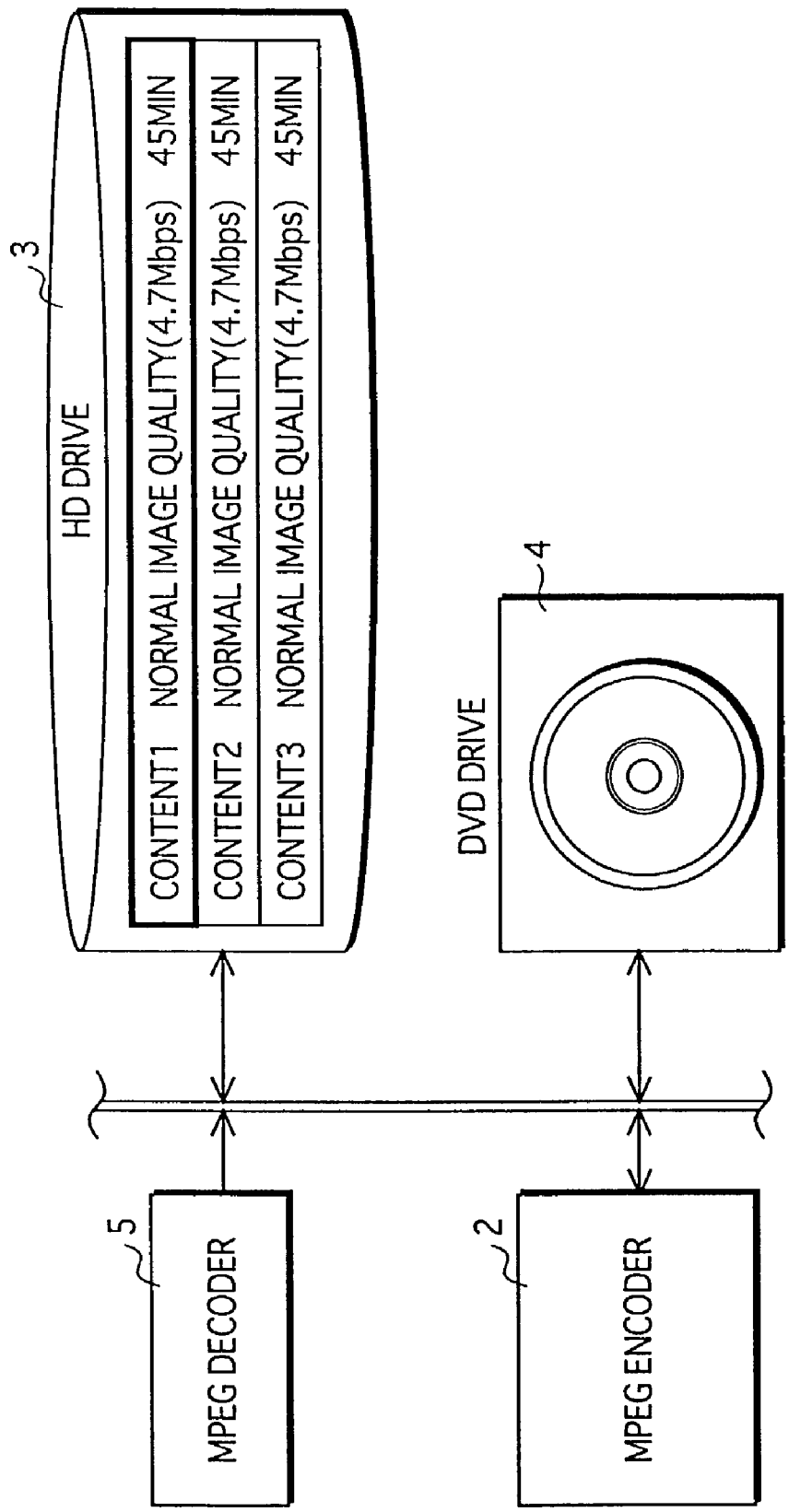

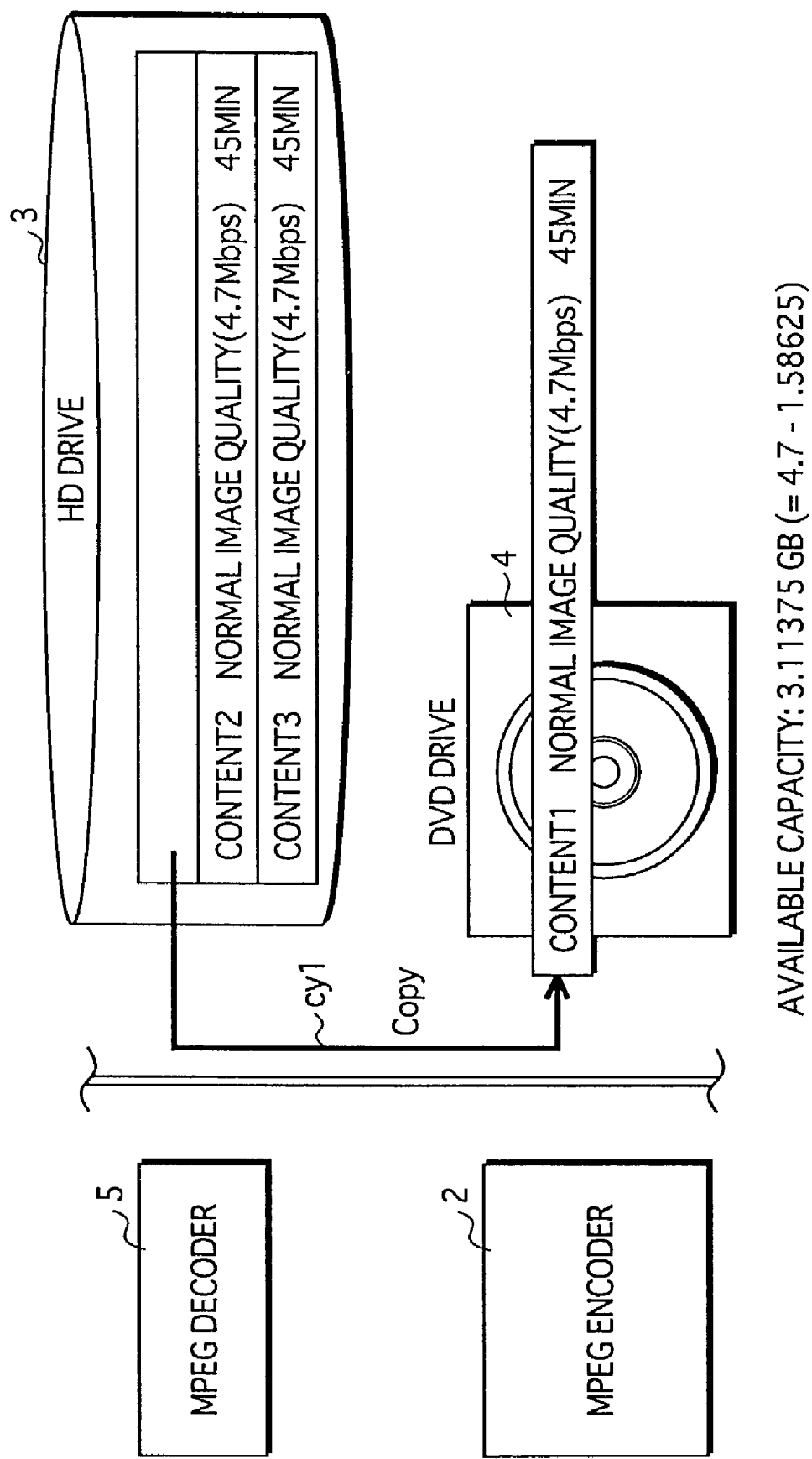
FIG.4B COPY

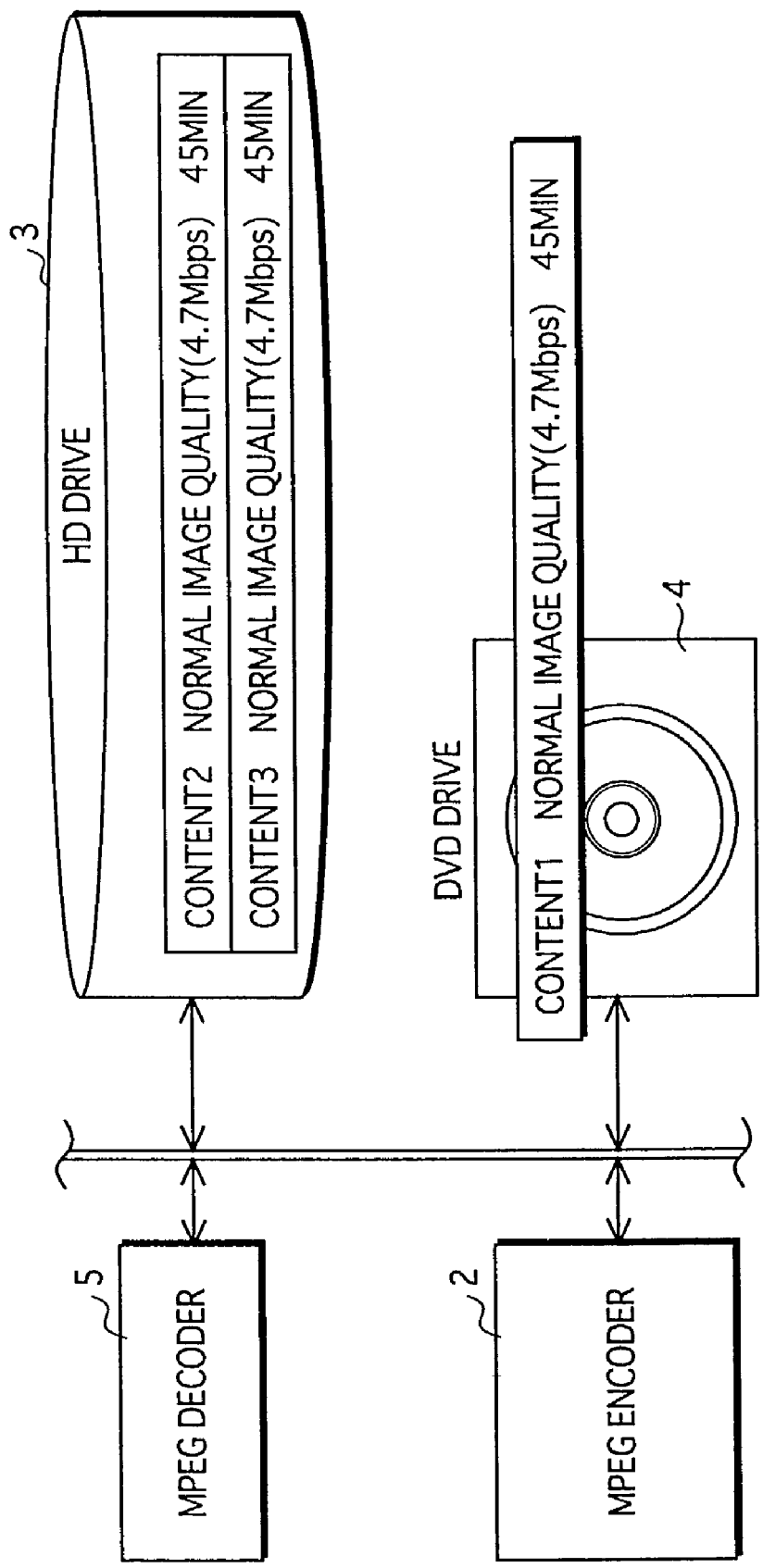

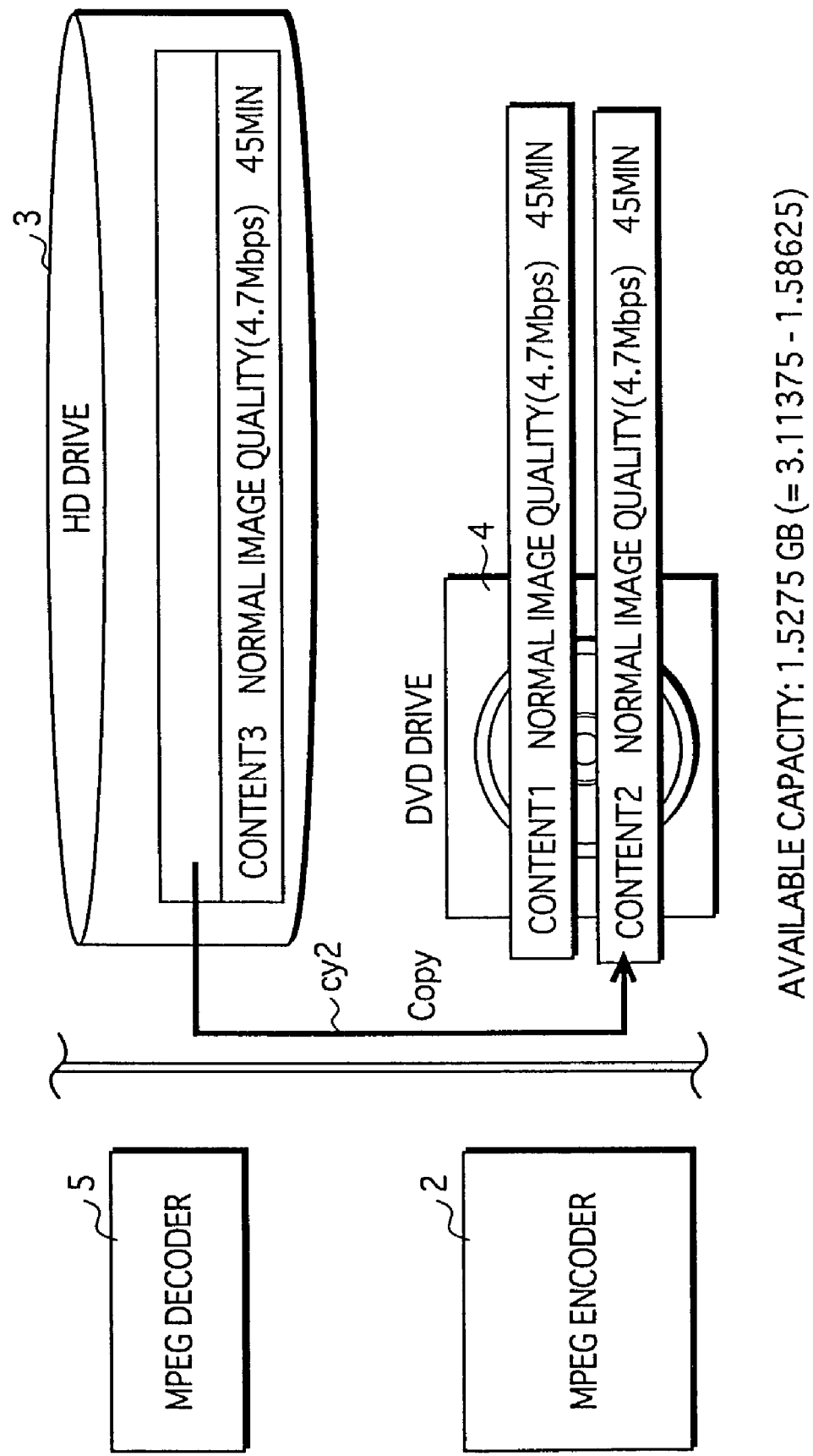
FIG.5B COPY

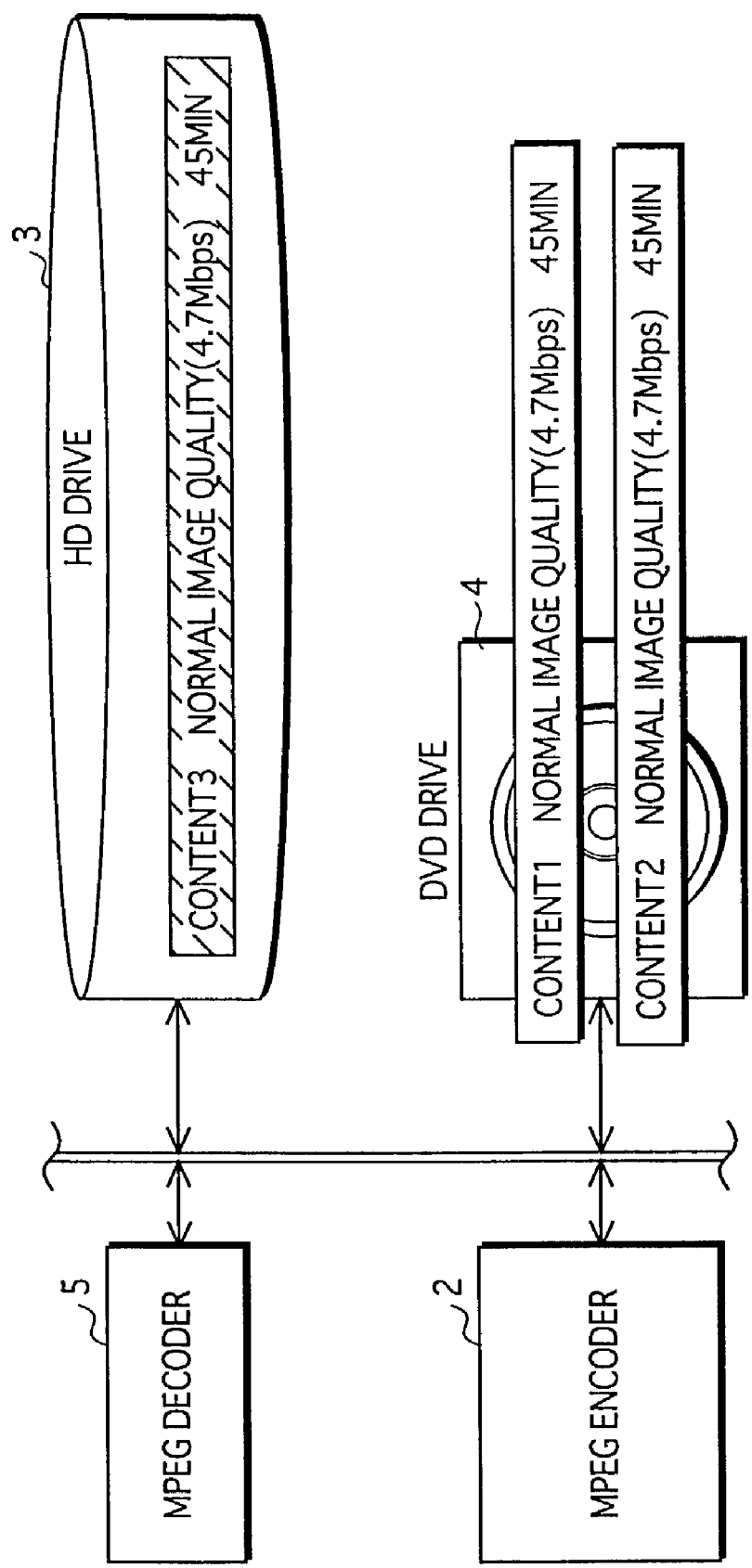

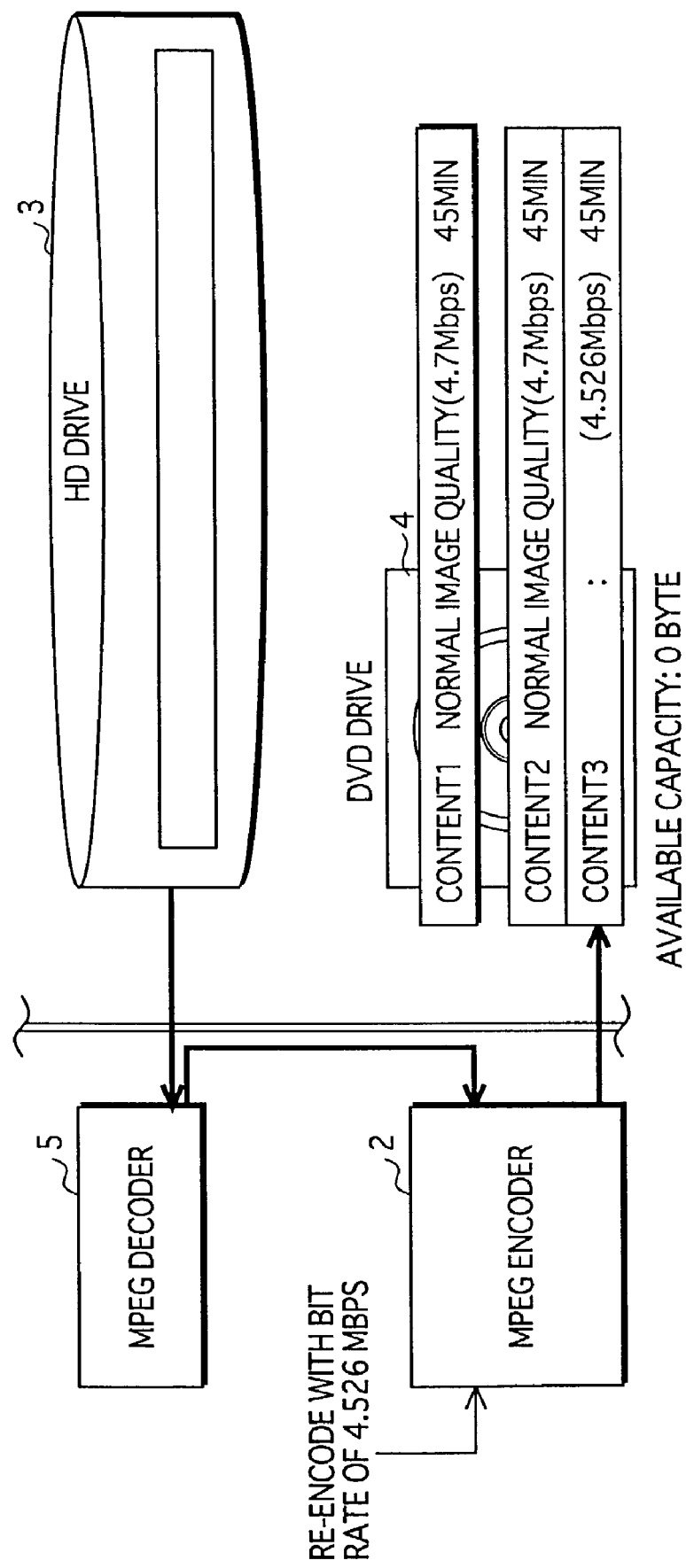

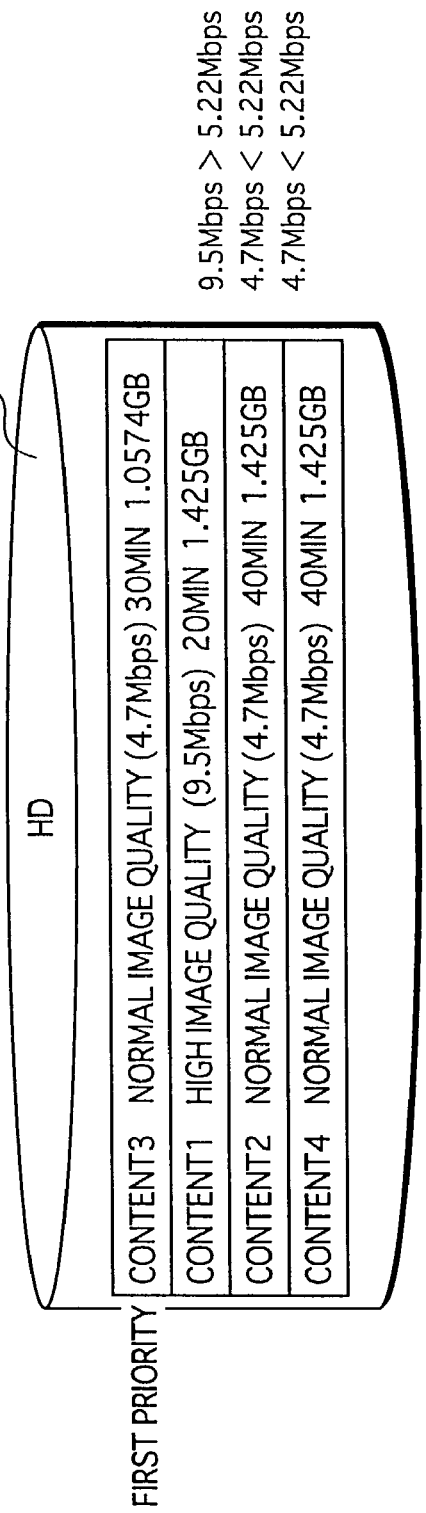
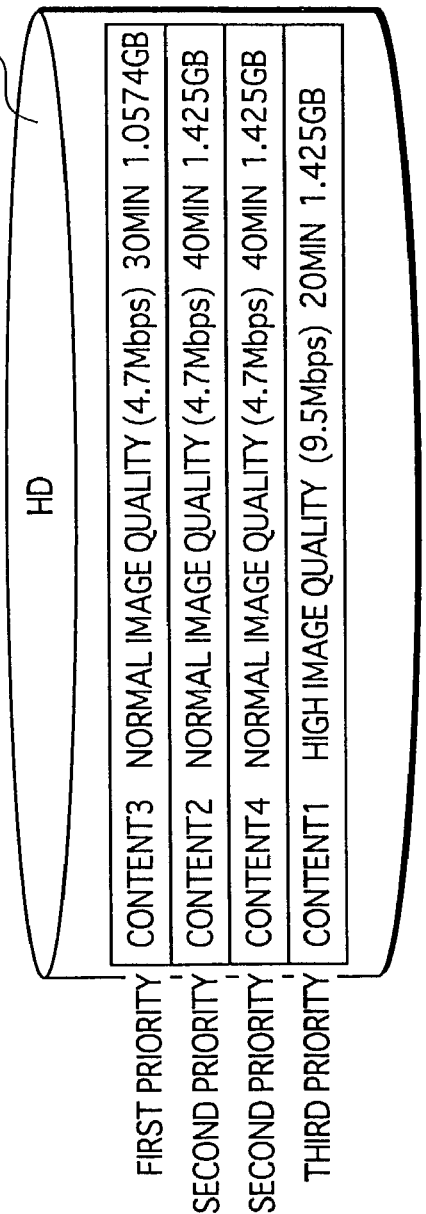

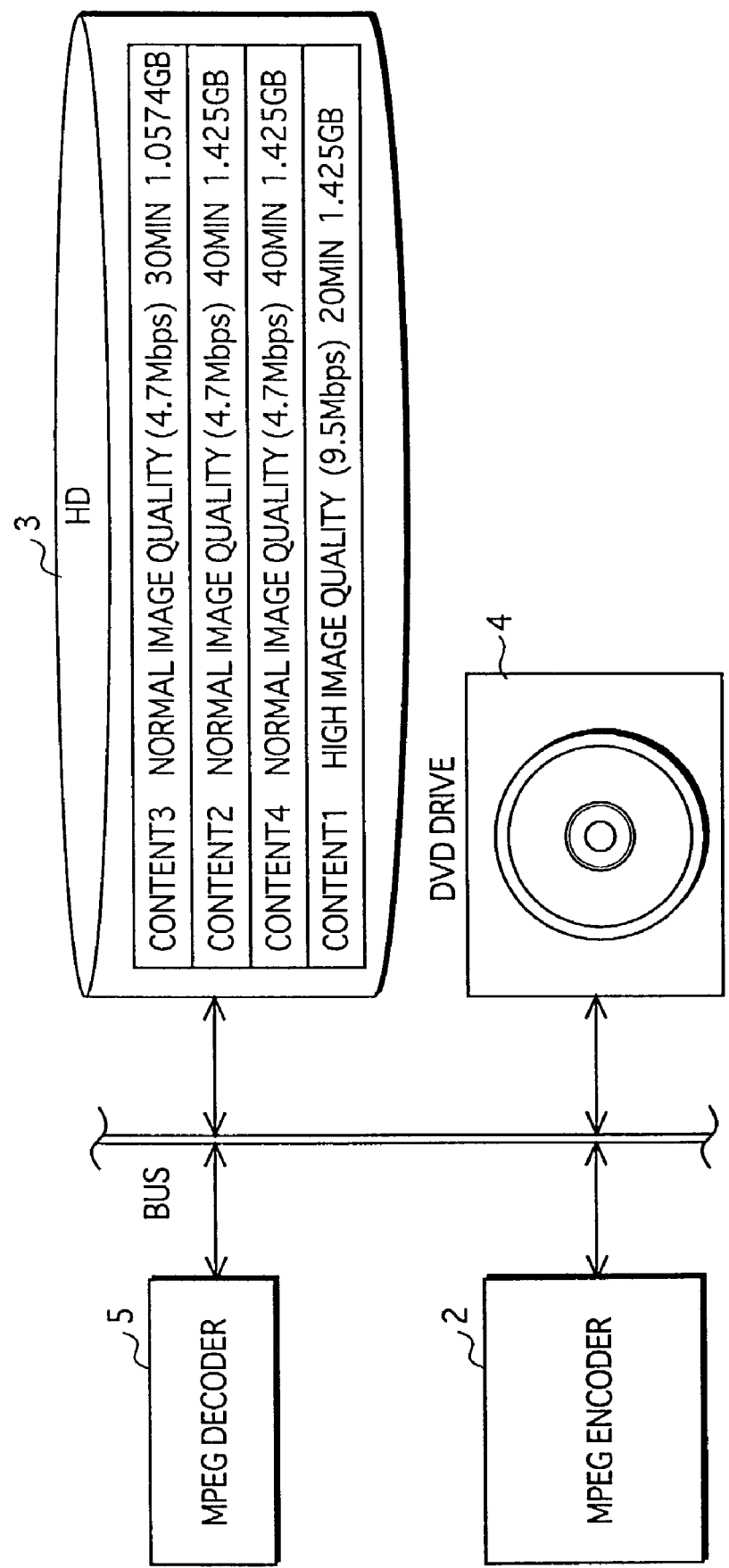

FIG.16A
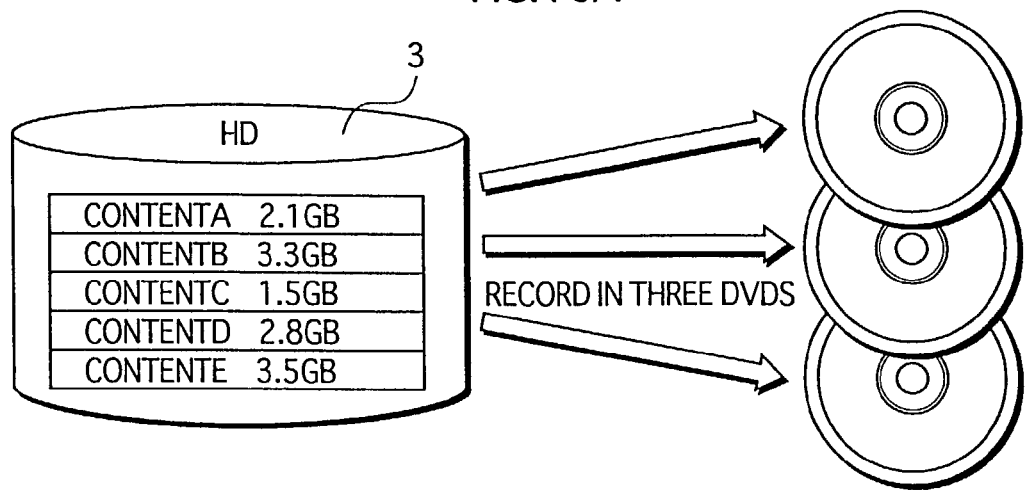
FIG.16B
|  | COMBINATION |
|---|---|
| FIRST DVD | CONTENT B,C |
| SECOND DVD | CONTENT A,D |
| THIRD DVD | CONTENT E |
FIG.16C
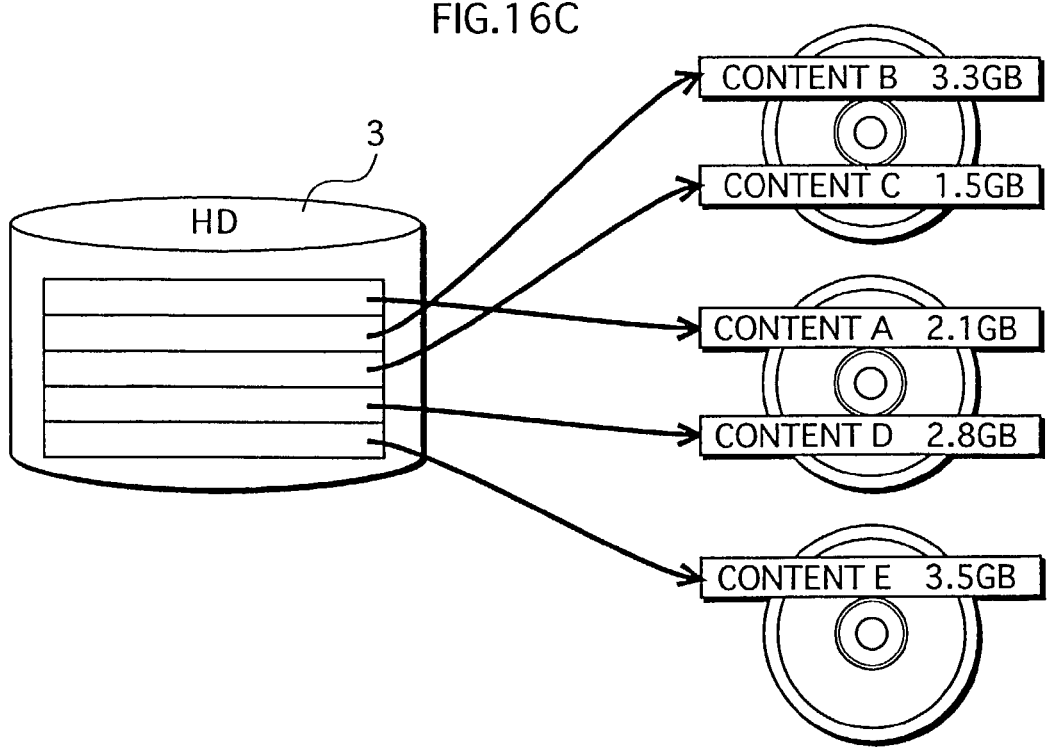

RECORDING APPARATUS, RECORDING PROGRAM, AND RECORDING METHOD

BACKGROUND OF THE INVENTION (1) Field of the Invention

The present invention relates to a recording apparatus, such as a hybrid type recorder, that performs a dual function as a DVD recorder for a DVD (Digital Versatile Disc) and an HD recorder for an HD (hard disk), as well as to a recording program and a recording method. More particularly, the present invention relates to an improvement in a technique for making a backup copy of a content recorded in one recording medium in another recording medium.

(2) Description of the Related Art

Manufacturers of DVD recorders and HD recorders are now competing fiercely to develop better products to capture the market for replacements of home use VCRs. DVDs and HDs respectively have their merits and demerits, and it is difficult to decide which are superior to which. For this reason, the consumer electronics manufacturers have started to commercially introduce hybrid type recorders that perform a dual-function as a DVD recorder and a HD recorder.

Internally equipped with a large-capacity HD of, e.g., 80 gigabytes, such a hybrid type recorder is capable of temporarily storing contents equivalent to half a day or whole day broadcasting. The user is then selectively copies, from the HD to a DVD, contents that are worth saving permanently out of a number of temporarily stored contents. With the full use of this copy function from the HD to a DVD, a number of contents stored in the HD are easily organized.

However, there is a problem as follows. That is, due to the difference between an HD and a DVD in storage capacity, there may be a case where contents can not be copied into a DVD in the combination that the user desires. To be more specific, consideration is give to an example in which a user desires to copy three of the contents stored in the HD into one DVD. In such a case, the hybrid type recorder starts to copy the contents one by one after confirming that the capacity of the DVD remaining available is sufficient to record the content. Here, it is possible that, after storing the first two contents, the available capacity is slightly short for recording the third content, and the recording apparatus informs the user that the DVD is full. In this case, the third content can not be recorded unless the user has another DVD available at hand. In addition, even if the user does have another DVD, the third content ends up being recorded on a separate DVD from the first and the second contents. This is especially undesirable when the three contents are three serials that together complete one drama. Un like when they are stored in the HD, the three contents are separately recorded on more than one DVDs. Thus, the three contents are no longer treated as one set of data although they all belong to one serialized drama, which may be frustrating for the user.

SUMMARY OF THE INVENTION

An object of the present invention is to provide a recording apparatus capable of recording contents stored in one recording medium to a different recording medium even when the total size of the contents to be recorded is larger than the capacity of the different recording medium.

The above object is achieved by a recording apparatus for writing a plurality of contents stored in a first recording medium to a second recording medium that is smaller in capacity than the first recording medium. Each content is obtained by encoding moving pictures. The recording apparatus comprises a first duplicating unit operable to copy at least one of the contents to the second recording medium; and a second duplicating unit operable to re-encode a remaining one of the contents to reduce a size thereof, and to write the re-encoded content to the second recording medium. A bit rate to be allocated to the remaining content upon re-encoding is determined based on (i) a residual capacity of the second recording medium that is left after subtracting, from a current capacity, a size of the content to be copied by the first duplicating unit, and (ii) a reproduction time of the remaining content to be re-encoded by the second duplicating unit.

The-bit rate allocated upon re-encoding is determined based on (i) the residual capacity of the second recording medium that is left after subtracting the size of the content to be copied from the current capacity of the second recording medium, and (ii) reproduction time of the content to be re-encoded. Thus, the bit rate to be allocated is a highest bit rate that ensures the re-encoded content will have the size recordable into the second recording medium. Since the bit rate is not over-reduced, the image degradation resulting from the re-encoding is minimized. When the capacity of the second recording medium is short only slightly, the image degradation resulting from the re-encoding is also slight. Thus, the re-encoded content is recorded in the second recording medium without noticeable image degradation.

Note that the term "duplicate" used in this specification is to write a content stored in the first recording medium to the second recording medium. Thus, the term includes to "copy" a content, as well as to "re-encode and write" a content.

Here, the recording apparatus may further comprise a detecting unit operable to detect a bit rate allocated to each of the contents stored in the first recording medium. The remaining content to be-re-encoded by the second duplicating unit is a content whose bit rate exceeds a predetermined indicator. The indicator is determined based on (i) the residual capacity of the second recording medium, and (ii) a total reproduction time of the contents stored in the first recording medium other than the content to be copied by the first duplicating unit.

With this construction, to be re-encoded is a high image quality content whose original bit rate is high. Due to its high bit rate, such a content is bulky even if the reproduction time is short. By selectively re-encoding such a content, writing of contents to the second recording medium is completed within a short time. In addition, a plurality of contents stored in the first recording medium can be written to the second recording medium even when the total size of the contents is much greater than the capacity of the second recording medium.

Here, the recording apparatus may further comprise a display unit operable to display time required for re-encoding the remaining content. The time required for re-encoding is equal to reproduction time of the remaining content. The recording apparatus may further comprise a receiving unit operable to receive, after the reproduction time is displayed, a user input instructing whether to perform the re-encoding. The second duplicating unit performs the re-encoding only in response to the user input instructing to do so.

With this construction, the user is informed, prior to re-encoding, to what extent the image quality will be degraded. Thus, the user is allowed to intuitively recognize to what extent the image quality will be degraded without understanding the technical meaning of re-encoding or bit rates. In addition, the user has an option to cancel the backup processing being performed if the bit rate needs to be extremely lower. Thus, the backup processing is performed in compliance with the user's requests.

Here, the recording apparatus may further comprise a receiving unit operable to receive a user input specifying a content, among the plurality of contents stored in the first recording medium, to be recorded without any image degradation. The content to be copied by the first duplicating unit is the user-specified content. The remaining content to be re-encoded by the second duplicating unit is a content other than the user-specified content.

With this construction, the user is informed, prior to re-encoding, of the time required for re-encoding. Thus, the user has an option to cancel the backup processing being performed if the re-encoding will take an extremely long time. Thus, the backup processing is performed in compliance with the user's requests.

Here, the recording apparatus may further comprise a detecting unit operable to detect a bit rate allocated to each of the contents stored in the first recording medium. The remaining content to be re-encoded by the second duplicating unit is a content other than the user-specified content and whose bit rate exceeds a predetermined indicator. The indicator is determined based on (i) the residual capacity of the second recording medium, and (ii) a total reproduction time of the contents stored in the first recording medium other than the content to be copied by the first duplicating unit. The residual capacity of the second recording medium is obtained by subtracting the size of the user-specified content from the current capacity.

With this construction, the user is allowed to make selection as to which content is to be copied and which content is to be re-encoded, rather than the recording apparatus automatically makes the selection. Since the re-encoding is performed in compliance with the user's requests, some contents are selected to be recorded at high image quality and some are not approximately as the user desires.

Here, the recording apparatus may further comprise a receiving unit operable to receive a user input specifying a space size to be preserved in the second recording medium. The current capacity of the second recording medium is obtained by subtracting in advance the specified space size.

With this construction, a free space is preserved in the second recording medium for later recording a content scheduled to be broadcast in the feature.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2A is a view showing one example of GUI controlled by a GUI controller 17;

FIG. 2B is a view showing contents selected to be backed up;

FIGS. 4A and 4B are views showing the change in the available capacity of DVD before and after a first content is copied;

FIGS. 5A and 5B are views showing the change in the available capacity of DVD before and after a second content is copied;

FIGS. 6A and 6B views showing the change in the available capacity of DVD before and after a third content is copied;

FIGS. 10A and 10B are views showing a process in which a second priority content and a third priority content are designated;

FIGS. 11A and 11B are views showing a process in which the first priority content and the second priority content are copied from the HD to the DVD;

FIG. 16A is a view showing how many DVDs are to be used to record five contents A-E;

FIG. 16B is a view showing the combinations of contents A-E to be recorded in each of three DVDs;

FIG. 16C shows a process in which each content is copied to DVDs in the determined combinations shown in FIG. 16B;

DESCRIPTION OF THE PREFERRED EMBODIMENT

First Embodiment

Hereinafter, description is given to a hybrid type recorder performing a dual function as a DVD recorder and an HD recorder according to one embodiment of a recording apparatus of the present invention.

The hybrid type recorder of the present embodiment includes an HD, and temporarily stores a number of contents in the HD. Among the temporarily stored contents, contents worth being saved permanently can be selectively recorded in a DVD. Referring now to its construction, an audio visual content is composed of at least one VOB (Video Object) and management information regarding the VOB or VOBs. A VOB is a program stream obtained by interleaved multiplexing a video stream and an audio stream. As above, each VOB includes management information. Yet, it makes the description too complex to mention processing on the management information. Thus, in the following description, no consideration is given to the management information for the simplicity sake, and VOBs are considered to be equal to audio-visual contents.

Figure 1:
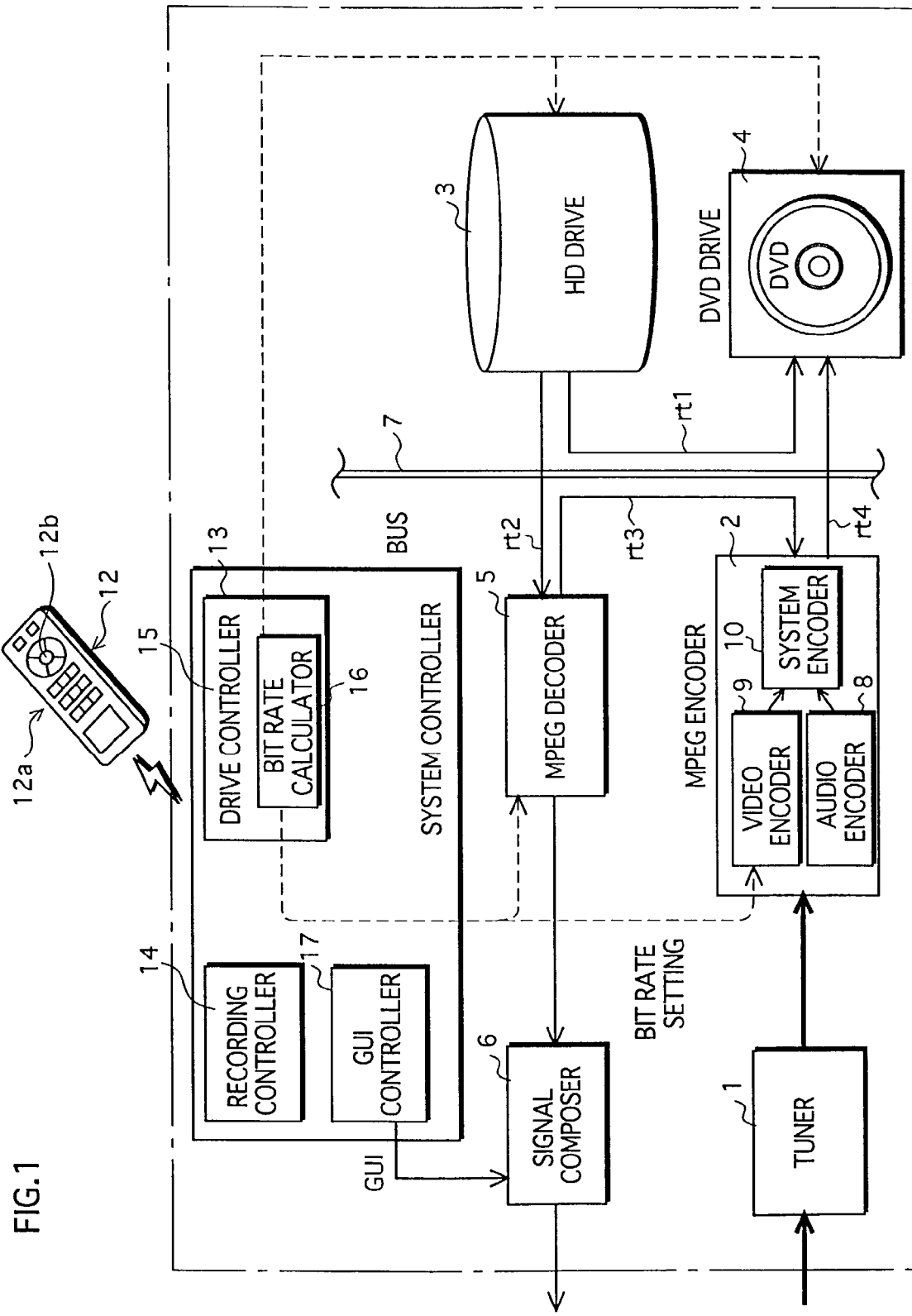
FIG. 1 is a view showing the internal construction of a recording apparatus.

Hereinafter, description is given to the embodiment of the recording apparatus with reference to the drawings. FIG. 1 is a view showing the internal construction of the recording apparatus. As shown in the figure, the recording apparatus is composed of a tuner 1, an MPEG encoder 2, an HD drive 3, a DVD drive 4, an MPEG decoder 5, a signal composer 6, a bus 7, an audio encoder 8, a video encoder 9, a system encoder 10, a remote controller 12, a system controller 13, a recording controller 14, a drive controller 15, a bit rate calculator 16, and a GUI (Graphical User Interface) controller 17. Of these components, the MPEG encoder 2, the HD drive 3, the DVD drive 4, and the MPEG decoder 5 are interconnected via the bus 7 in a bus topology.

The tuner 1 demodulates a broadcast wave to obtain a video signal and an audio signal, and outputs the obtained signals to the MPEG encoder 2.

The MPEG encoder 2 encodes the analog video signal and the analog audio signal to generate a content (synonymous with VOB). Prior to the encoding, the MPEG encoder 2 receives an instruction specifying a bit rate from the system controller 13, and then performs encoding at the specified bit rate. The "bit rate" refers to a quantization bit rate indicating the number of bits that is allocated to represent a moving picture image per unit time. Being allocated a high bit rate, the resulting image will be of high quality. On the other hand, being allocated a low bit rate, the resulting image will be of low image quality. By varying the bit rate, the resulting image quality is adjusted. Yet, when a bit rate is higher, not only that the resulting image will be of higher in quality but also that the content will be larger in size. Users should note this relation between the image quality and the content size when recording a content into the HD or a DVD.

The HD drive 3 includes an HD for temporarily storing a plurality of contents generated by the MPEG encoder 2. The capacity of the HD is 80 gigabytes so that broadcast contents equivalent to half a day or a whole day broadcasting can be temporarily stored in the HD.

The DVD drive 4 is used with a DVD with a 4.7-gigabyte capacity installed therein, and performs reading and writing of data on the DVD. The DVD used in the present embodiment is a recordable DVD, such as a DVD-RAM, DVD-R, DVD-RW, and DVD+RW. Unlike the HD which is integrally included in the HD drive 3, the DVD is portable and replaced with another DVD as necessary.

The MPEG decoder 5 decodes the content (VOB) to obtain an audio signal and a video signal.

The signal composer 6 composes the video signal outputted from the MPEG decoder 5 with GUI, and outputs the resulting signal to a television set provided externally to the recording apparatus.

The bus 7 interconnects the MPEG encoder 2, the HD drive 3, the DVD drive 4, and the MPEG decoder 5.

The audio encoder 8 is one component constituting the MPEG encoder 2, and encodes a signal segment of the analog audio signal corresponding to 0.4-1.0 seconds to obtain a collection of audio frames each corresponding to 0.4-1.0 seconds.

The video encoder 9 is another component constituting the MPEG encoder 2, and encodes a signal segment per unit time of the analog video signal that is outputted from the tuner 1 to obtain a collection of picture data. Here, the unit time corresponds to 0.4-1.0 seconds, and the collection of picture data constitutes a GOP (Group Of Pictures). In the case where the system controller 13 has been set with a bit rate A, the video encoder 9 allocates to each VOBU (Video Object Unit) the bit rate varied within the range of A±α. With this arrangement, a higher bit rate is allocated to a VOBU representing a high-motion image, while a lower bit rate is allocated to a VOBU representing a low-motion image. Further, the video encoder 9 writes, in a system header of each VOBU, the bit rate allocated to the VOBU. A system header is header information provided at the top each VOBU. With reference to the bit rate written in the system header prior to encoding the VOBU, the transmission rate required for decoding the VOBU is known.

The system encoder 10 is yet another component of the MPEG encoder 2, and generates VOBUs each corresponding to reproduction for a unit time of 0.4-1.0 seconds by interleaved multiplexing a GOP with a collection of audio frames.

The remote controller 12 is a device for a user to make an input to operate GUI, and provided with a cross key 12a, an enter key 12b for receiving such an input.

The system controller 13 includes CPU, ROM, and RAM, and performs overall control of the recording apparatus by the CPU executing a program stored in the ROM. In other words, being read by the CPU, the program functions as the recording controller 14, the drive controller 15, and the GUI controller 17.

The recording controller 14 controls the MPEG encoder 2 and the HD drive 3 so that contents are recorded. To be more specific, when the tuner 1 is modulating a broadcast wave and a user instructs recording, the recording controller 14 controls the MPEG encoder 2 to perform encoding to obtain contents, and to transmit the contents via the bus 7 to the HD drive 3 that is controlled to record the contents in the HD. Upon controlling the MPEG encoder 2 to perform encoding, the recording controller 14 sets a bit rate at which the MPEG encoder 2 performs encoding. Here, there are four levels of bit rates one of which the user selects: 1.6 Mbps (low image quality for economical recording), 2.4 Mbps (low image quality suitable for an extended period of recording), 4.7 Mbps (normal image quality), and 9.5 Mbps (high image quality). The four levels are provided merely as reference values to realize targeted image quality levels. Actually, any bit rate within the range of 1.6-9.5 Mbps may be arbitrarily allocated.

The drive controller 15 performs backup of the HD by having contents read from the HD and written in the DVD. The drive controller 15 performs the following two different types of backup processing: (1) processing via the MPEG decoder 5 and the MPEG encoder 2, and (2) processing without employing either the MPEG-decoder 5 or the MPEG encoder 2.

In the type (1) processing, the contents read from the HD are decoded by the MPEG decoder 5 and then encoded again by the MPEG encoder 2 prior to being recorded in a DVD.

In the figure, the arrows rt2, rt3, and rt4 indicate the transmission path of the contents according to the type (1) processing. As indicated by the arrows, the contents are transmitted from the HD→the MPEG decoder 5→the MPEG encoder 2→the DVD where the contents are to be recorded. The decoding and encoding performed in series by the MPEG decoder 5 and the MPEG encoder 2, respectively, are together referred to as "re-encoding". The decoding of a content by the MPEG decoder 5 requires time taken to actually reproduce the content. This is because the decoding requires that the content be once put back into a video signal and an audio signal. That is, a content for one hour takes one hour for the backup processing.

The type (2) processing is drive-to-drive copying of contents. According to this processing, contents read from the HD drive 3 are transmitted via the bus 7 directly to the DVD drive 4 where the contents are recorded in the DVD. In the figure, the arrow rt1 indicates the transmission path of the contents according to the type (2) processing. As indicated by the arrow, the contents are transmitted from the HD→the bus 7→the DVD where the contents are to be recorded. In this drive-to-drive copying, the re-encoding is not involved. In addition, the transmission rate of the bus 7 is extremely high. Thus, backup of contents of several gigabytes are completed within few seconds. Selection as to which type of backup processing is to be performed is made depending on the available capacity of the DVD.

The bit rate calculator 16 is a component of the drive controller 15. At that time the drive controller 15 performs re-encoding, the bit rate calculator 16 calculates a bit rate A satisfying the expression below.

$$\text{Capacity} \geq \text{Reproduction Time} \times \text{Bit Rate } A/8 \qquad \text{<Expression 1>}$$

When any data has been already recorded in the DVD, the left side of the expression 1 needs to be a value obtained by subtracting the size of the already recorded data from 4.7 gigabytes. Yet, if consideration is given to such already recorded data, the description will be too complex. Thus, the following description is given to the case where recording is performed on a blank DVD in which no data has been recorded yet. Strictly speaking, in addition, since an audio stream is reproduced in synchronism with a video stream, the data size of the audio stream must be added to the right side of the expression 1. However, the audio stream is so small in data size comparing the video stream that it may be ignored. Thus, the bit rate is calculated by approximate calculation using the expression 1.

The GUI controller 17 generates GUI and composes the GUI with the video signal. In addition, the GUI controller 17 performs integral control of the recording apparatus according to user operations. GUI provides GUI components, which are graphical representations of a plurality of contents stored in the HD. FIG. 2A is a view showing one example of GUI controlled by the GUI controller 17. In the figure, the GUI component which reads e.g., "CONTENT 1 2002 11/3 CH3 PM 8:00-PM 8:45 NORMAL IMAGE QUALITY" represents a content. There are three possible states for a GUI component to be in: a normal state; a focused state; and an active state. The normal state indicates that the content represented by the GUI component is not currently subjected to user selection. The focused state indicates that the content represented by the GUI component is currently a candidate to be selected. The active state indicates that the content represented by the GUI component has been selected to be backed up. Through operations to GUI, among the contents 1-5 shown in FIG. 2A, the contents 1-3 are selected to be backed up as shown in FIG. 2B. The GUI controller 17 instructs the drive controller 15 to back up the contents that are in active stated in the GUI.

Figure 3:
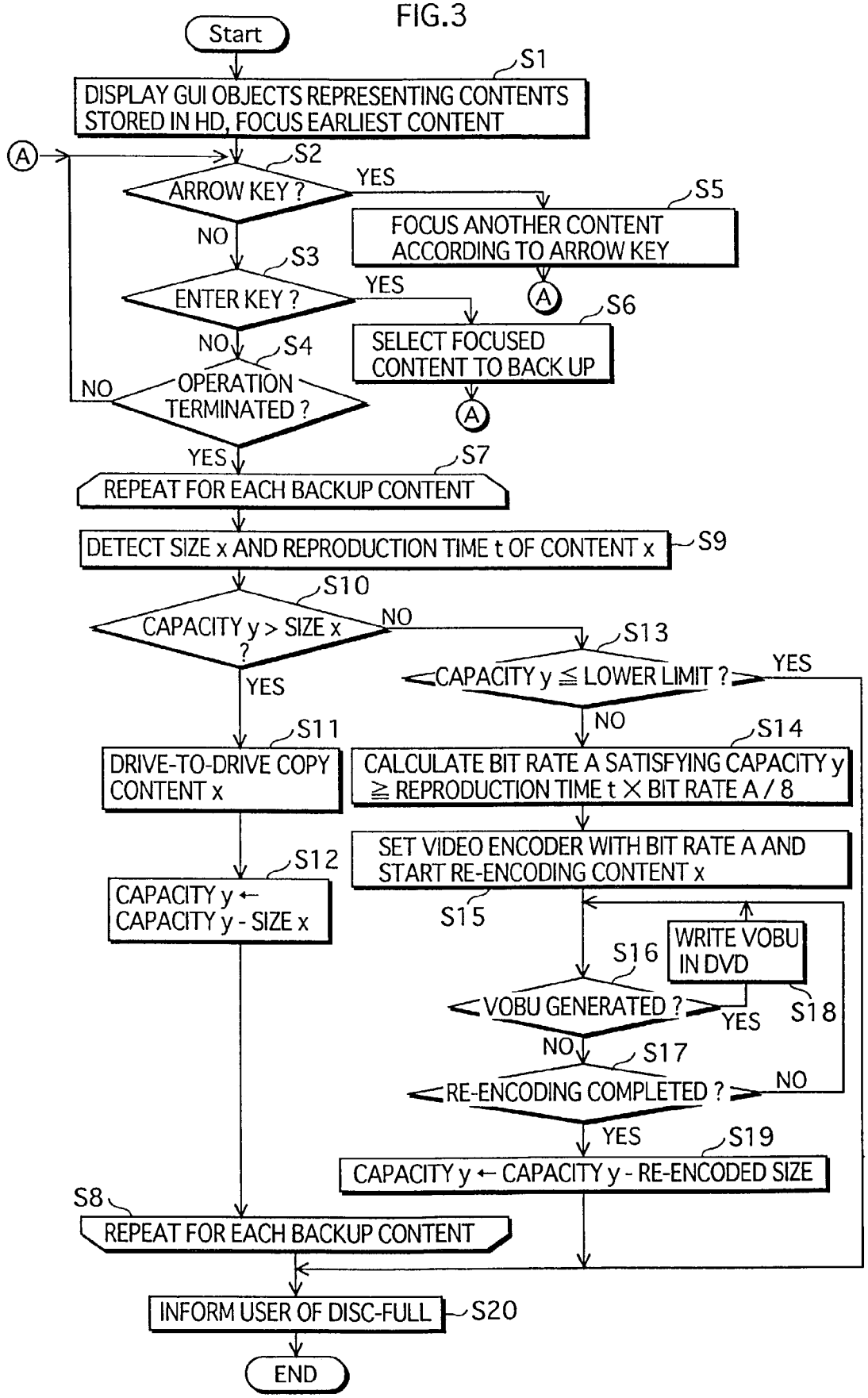
FIG. 3 is a flowchart showing processing performed by a drive controller 15, a bit rate calculator 16, and the GUI controller 17.

FIG. 3 is a flowchart showing the sequence of program steps for implementing the drive controller 15, the bit rate calculator 16, and the GUI controller 17. Hereinafter, with reference to the flowchart, description is given to the steps performed by the drive controller 15, the bit rate calculator 16, and the GUI controller 17.

In a step S1, the GUI controller 17 displays GUI providing GUI components each graphically representing one of a plurality of contents stored in the HD. Initially, the content recorded earliest is displayed in a focused state.

Next, the GUI controller 17 enters the loop for repeatedly performing steps S2-S4. The loop is an event waiting loop that is repeated until one of the following events is received: a push of an arrow key of the remote controller 12 (step S2); a push of the enter key of the remote controller 12 (step S3); or termination of user operations (step S4). In response to a push of an arrow key, the GUI controller 17 sets, in a step S5, the content specified by the arrow key into a focused state. To be more specific, there are an up-pointing arrow key and a down-pointing arrow key. In response to a push of the down-pointing arrow key, the GUI controller 17 puts a currently focused content back to a normal state, and sets a content displayed below that content to a focused state. On the other hand, in response to a push of the up-pointing arrow key, the GUI controller 17 puts a currently focused content back to a normal state, and sets a content displayed above that content to a focused state.

In response to a push of the enter key, the GUI controller 17 sets, in a step S6, a currently focused content to an active state, so that the content is selected to be backed up. By performing the above steps in response to events made, contents stored in the HD are selected to be backed up. When a plurality of contents is selected and a termination operation is detected, the GUI controller 17 moves to a step S7.

Steps S7 and S8 form a loop to perform steps 9-19 repeatedly for each of the contents selected to be backed up. Here, the order of contents subjected to the loop processing may be any order. In this embodiment, the loop processing is sequentially performed on each selected content starting from the one with the earliest recording date and time.

In this loop processing, a content targeted for a current iteration of the loop is denoted by a content x. The drive controller 15 detects the size x and the reproduction time t of the content x (step S9) to judge whether the available capacity y of the DVD exceeds the size x (step S10). If the capacity y exceeds the size x, the drive controller 15 performs drive-to-drive copy of the content x (step S11), followed by subtraction of the size x from the capacity y (step S12). By the series of operations, the content is copied from the HD to the DVD. Each time a content is copied from the HD to the DVD, the available capacity of the DVD decreases stepwise. Yet, copying of a content is repeatedly performed as long as the available capacity of the DVD exceeds the size of the content x.

In the case where the available capacity of the DVD is smaller than the size of the content x, the drive controller 15 performs steps S13-S19. In the step S13, the drive controller 15 judges whether the capacity falls short of a predetermined lower limit. Here, the lower limit is set to be less than $1/10$ of the data size of the content x. This is because, if a content is reduced to less than $1/10$ of its original size, the resulting image quality of the content is no longer acceptable.

The lower limit is set in order to avoid such an excessive reduction. When the capacity y is below the lower limit, the drive controller 15, in a step S20, informs the user that the disc is full and terminates the processing. In the case where the capacity is not enough to copy the content x but still exceeds the lower limit, the drive controller 15 instructs, in the step S14, the bit rate calculator 16 to calculate a bit rate A that satisfies the expression: Capacity y≧Reproduction Time t×Bit Rate A/8. The drive controller 15 then sets, in the step S15, the video encoder 9 with the bit rate A, and instructs the MPEG encoder 2 to start re-encoding the content x. Once re-encoding is started, the processing enters the loop to repeatedly perform steps S16-S18.

In this loop processing, the drive controller 15 checks whether the MPEG encoder 2 generates a VOBU (step S16), and whether the re-encoding has been completed (step S17). Each time a VOBU is generated (step S16, YES), the drive controller 15 instructs the MPEG encoder 2 to transmit the generated VOBU to the DVD drive 4 where the VOBU is recorded in the DVD (step S18). Upon completion of re-encoding (step S17, YES), the drive controller 15 subtracts the size of the re-encoded content from the capacity y of the DVD (step S19), to terminate the loop processing of step S16-S18.

Hereinafter, description is given in more detail to the steps of the flowchart shown in FIG. 3 with reference to specific examples shown in FIGS. 4A, 4B, 5A, 5B, 6A, and 6B.

First, among the contents shown in FIG. 2B, the first three contents i.e., contents 1-3, are selected to be backed up. Each of the contents 1-3 is one serial that together complete one serialized drama. The bit rate and the reproduction time of each content are uniformly 4.7 Mbps and 45 minutes, respectively. From the bit rate and the reproduction time, the data size of each content is calculated as follows.

$$4.7(\text{Mbps}) \times 45(\text{min}) \times 60(\text{sec})/8 = 1.58625\text{GB}$$

The three contents as above are sequentially recorded in the DVD through the processing according to the flowchart shown in FIG. 3. Note that the six figures, FIGS. 4A-6B collectively show, just like sequence photographs, one process in which the three of the contents shown in FIG. 2B are sequentially copied.

FIGS. 4A and 4B show the change in the capacity of DVD before and after the content 1 is recorded. When the content 1 is targeted as the content x, the capacity of the DVD is 4.7 gigabytes. Thus, the capacity check is made as shown in FIG. 4A, and the judgment in the step S10 results in YES. Consequently, the content 1 is copied from the HD to the DVD as indicated in FIG. 4B by the arrow cy1. Then, in the step S6, the size of the content 1 (1.58625 gigabytes) is subtracted from the capacity y (4.7 gigabytes).

FIGS. 5A and 5B show the change in the capacity of DVD before and after the content 2 is recorded. When the content 2 is targeted as the content x, the capacity y at this stage is 3.11375 gigabytes. Thus, the capacity check is made as shown in FIG. 5A, and the judgment in the step S10 results in YES. Consequently, the content 2 is copied from the HD to the DVD as indicated in FIG. 5B by the arrow cy2. Then, in the step S6, the size of the content 2 (1.58625 gigabytes) is subtracted from the capacity y (3.11375 gigabytes).

FIGS. 6A and 6B show the change in the capacity of DVD before and after the content 3 is recorded. When the content 3 is targeted as the content x, the capacity y at this stage is 1.5275 gigabytes. Thus, the capacity check is made as shown in FIG. 6A, and the judgment in the step S10 results in NO as the capacity y (1.5275 gigabytes) is slightly short of the size of the content x (1.58625 gigabytes). Yet, the capacity of 1.5275 gigabytes exceeds the lower limit, so that the resulting image quality will still be acceptable. Thus, the drive controller 15 moves from the step S13 to a step S14 to re-encode the content 3.

Prior to re-encoding, the bit rate to be newly allocated to the content is calculated. Here, the reproduction time and the size of the content are 45 minutes and 1.58625 gigabytes, respectively. Using these values, the bit rate A satisfying the following expression is calculated in the step S14.

$$A(\text{Mbps}) \times 45(\text{min}) \times 60(\text{sec})/8 = 1.5275 \text{ GB}$$

Thus, the bit rate A is calculated to be 4.526 Mbps.

Once the bit rate A is calculated as above, the video encoder 9 performs, as illustrated in FIG. 6B, re-encoding of the content 3 at the calculated bit rate A. As a result of the re-encoding, the content size is reduced from 1.58625 gigabytes to 1.5275 gigabytes, while the bit rate is reduced only slightly from the 4.7 Mbps to 4.526 Mbps. Since the reduction in the bit rate is slight, resulting deterioration in the image quality is also slight. As described above, with two copying operations and one re-encoding operation, the three contents that complete one serialized drama are recorded in a single DVD.

As described above, according to the embodiment 1, a plurality of contents recorded in the HD is stored in a single DVD even though the total size of the contents to be recorded exceeds the capacity of the DVD.

Embodiment 2

An embodiment 2 regards to selection of contents to be re-encoded. As described above, the re-encoding is a series of processing that decodes a content and again encodes the decoded content, which requires actual reproduction time. The actual reproduction time is the time taken to actually reproduce the content. That is, when it takes one hour to reproduce a content, it takes one hour to re-encode the content stored in the HD, followed by recording to a DVD. Since it is a time consuming processing, re-encoding is not an easy option to choose. In view of the above, the present embodiment performs scheduling so that the order of contents to be backed up is determined in a manner of minimizing the time taken for re-encoding. The order is determined based on priorities assigned to each content, namely first priority, second priority, and third priority. The first priority is assigned to a content with the highest priority so that the content is likely to be recorded in a DVD simply by copying. The third priority, on the other hand, is assigned to a content with the lowest priority so that the content is likely to be recorded in the DVD after being re-encoded.

Figure 7:
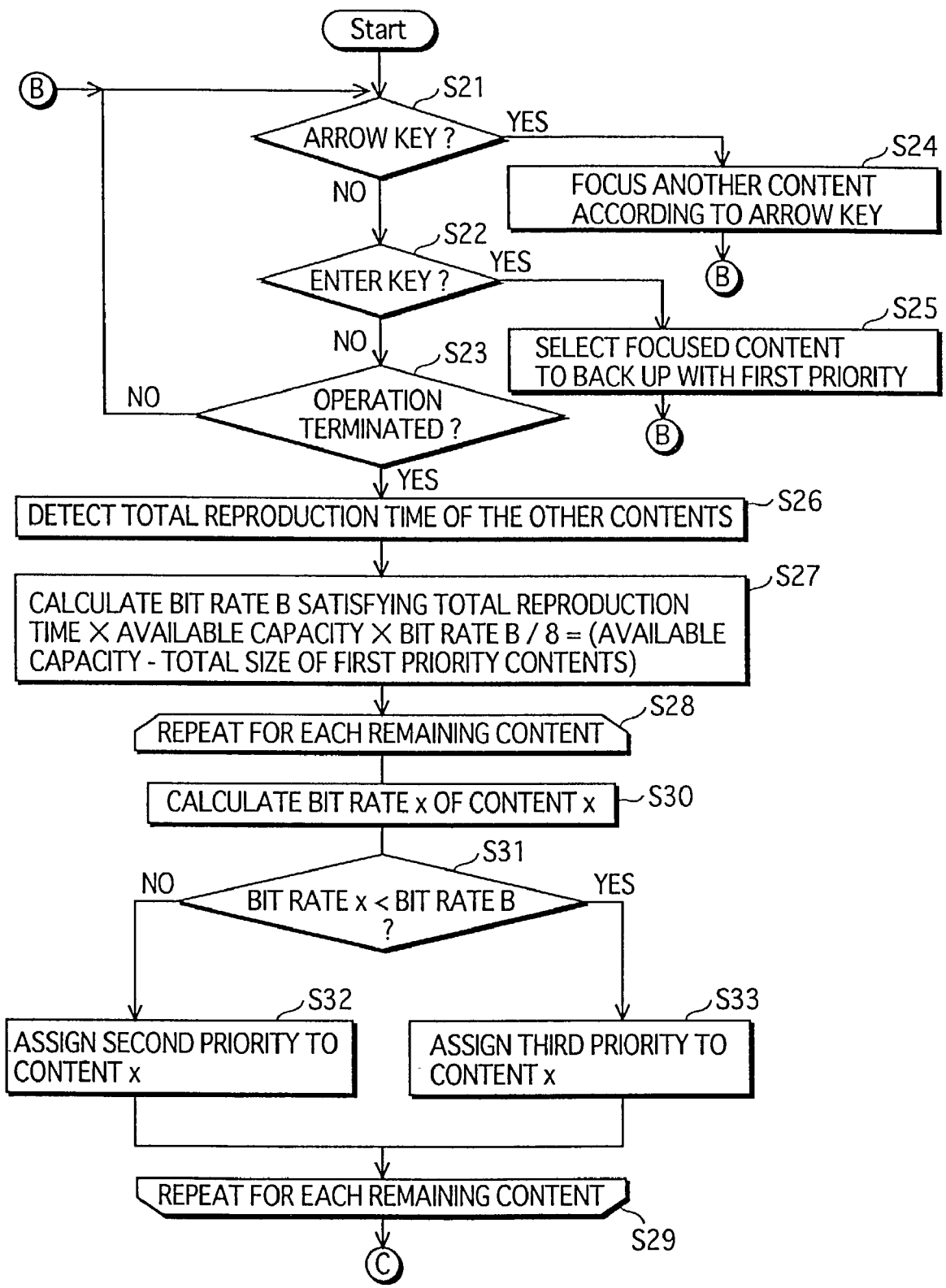
FIG. 7 is a flowchart showing backup processing according to an embodiment 2.
Figure 8:
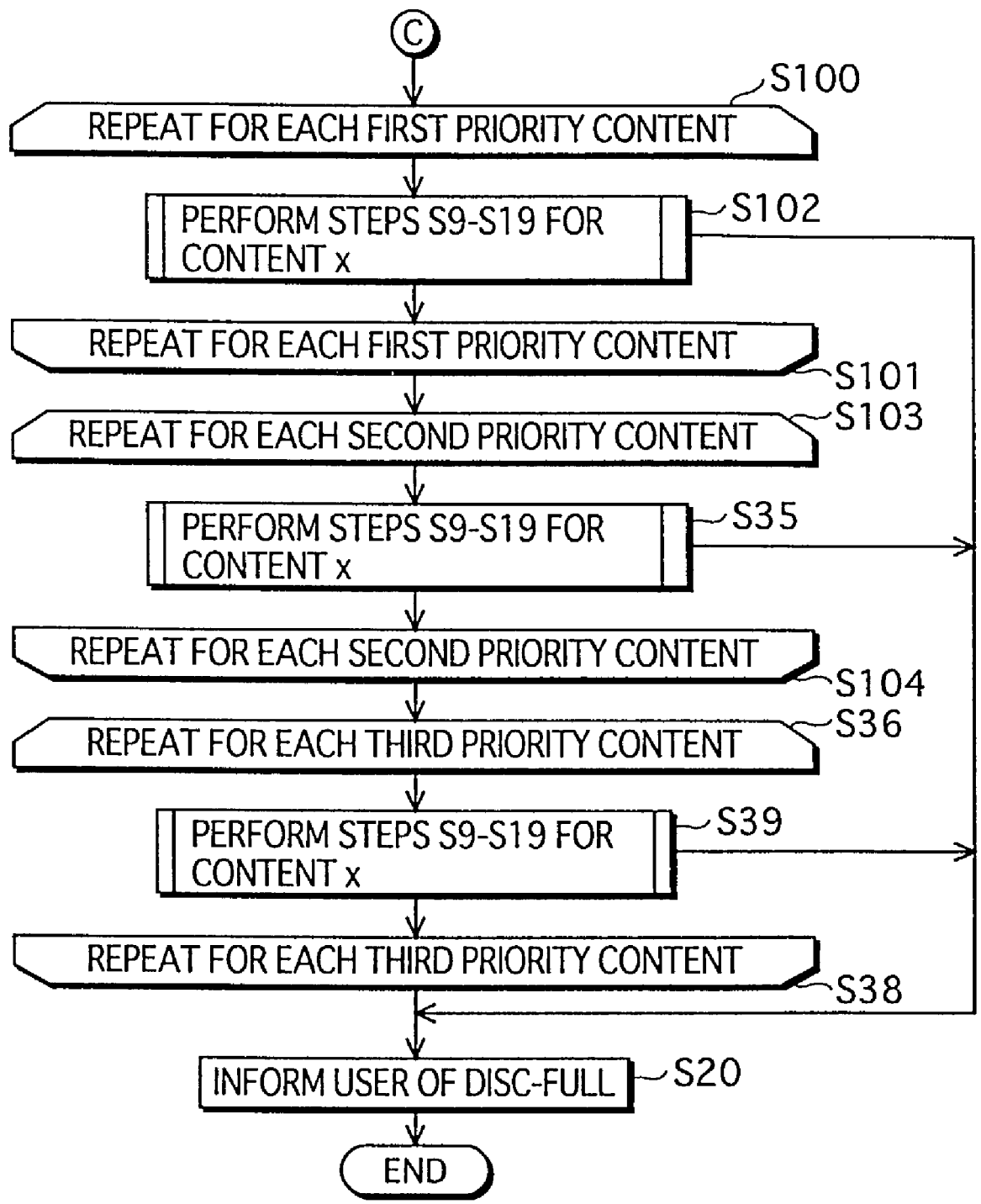
FIG. 8 is the flowchart showing backup processing according to the embodiment 2.

Now, description is given to the scheduling processing with reference to a flowchart shown in FIGS. 7 and 8. FIGS. 7 and 8 are views showing the flowchart of the backup processing according to the second embodiment.

The processing shown in the flowchart is performed on a plurality of contents selected to be backed up in the steps S1-S6 shown in FIG. 3. The GUI controller 17 displays GUI components each graphically represents a selected content, and the content which has been recorded earliest is displayed in a focused state. The GUI controller 17 then enters the loop for repeatedly performing steps S21-S25. The loop is an event waiting loop that is repeated until one of the following events is received: a push of an arrow key (step S21); a push of the enter key (step S22); or termination of user operations (step S23). With these events, contents to be copied are selected. Each content to be copied is a content that the user desires to record in a DVD without degrading image quality at an early stage of the overall processing. In response to a push of an arrow key, the GUI controller 17 sets, in a step S24, the content indicated by the arrow key to a focused state.

In response to a push of the enter key, the GUI controller 17 sets, in a step S25, a currently focused content to an active state so that the content is selected to be copied. The thus selected content is assigned the first priority.

In response to these events, the GUI controller 17 performs the above steps so that contents to be assigned the first priority are selected. When one or more contents are selected as first priority contents, and a termination operation is detected, the processing moves from the step S23 to a step S26. In the step S26, the bit rate calculator 16 calculates the total of reproduction time t of the remaining contents. In a step S27 that follows, the bit calculator 16 calculates a bit rate B that satisfies the following expression:

$$\text{Total Reproduction Time} \times \text{Bit Rate } B/8 =$$
$$(\text{Capacity} - \text{Total Size of First Priority Contents})$$

The thus calculated bit rate B serves as an indicator to judge whether to re-encode the remaining contents. Once the bit rate B is calculated, the processing enters a loop for repeatedly performing steps S28-S30. In the loop, a bit rate x of the content x is detected (step S30), and if the detected bit rate x is below the bit rate B serving as the indicator (step S31), the second priority is assigned to the content x (step S32). If not, the third priority is assigned to the content x (step S33). These steps are repeated for each of the remaining contents (steps S28 and S29).

The detection of the bit rate in the step S30 is performed using the following calculation. Each VOBU constituting a content has been allocated a bit rate A±α. Thus, the bit rate A specified by the system controller 13 is calculated backward by averaging a plurality of bit rates each assigned to a VOBU. The bit rate is recorded in the system header of each VOBU. Thus, the drive controller 15 reads, in the step S30, a plurality of bit rates from a plurality of system headers to calculate the average of the read bit rates, thereby obtaining the bit rate A. Note that the bit rate may be detected from the management information if the management information includes a bit rate calculated for, and allocated to each VOBU by the bit rate calculator 16.

Further, according to the expression used in the step S27 for calculating the indicator, the size of the first priority contents is subtracted from the available capacity of the DVD. Yet, in case no content has been assigned the first priority, the right side of the expression is simply equal to the capacity. In short, to be calculated is the bit rate B satisfying the following expression.

$$\text{Total Reproduction Time} \times \text{Bit Rate } B/8 = \text{Capacity}$$

Through the above steps, contents to be assigned the second priority have been selected. Once the first and the second priority contents are selected, backup of the contents stored in the HD to the DVD is performed in the priority order, i.e., starting from the contents with the first priority→the second priority→the third priority. The steps for backup processing are shown in the flowchart in FIG. 8. First, processing for backup of the first priority content is described. In this backup processing, the steps S9-S19 shown in FIG. 3 are repeated for each first priority content (step S100-S102). This processing is the same as the processing shown in FIG. 3 except that the contents to be recorded in the DVD are the first priority contents. In the case where the available capacity falls short to copy all the first priority contents, one or more first priority contents are re-encoded as necessary so as to reduce their size and then to be recorded in the DVD.

In the case, on the other hand, there is an available capacity left in the DVD after recording all the first priority contents, backup processing for the second priority contents is started. Here again, the backup processing of the second priority contents is carried out by repeating the steps S9-19 shown in FIG. 3 (steps S103, S35, S104). In the case where the available capacity falls short to store all the second priority contents, one or more second priority contents are re-encoded as necessary so as to reduce their size and then to be recorded in the DVD.

In the case, on the other hand, there still is an available capacity left in the DVD after recording all the second priority contents, backup processing for the third priority contents is started. Here again, the backup processing of the third priority content is carried out by repeating the steps S9-S19 shown in FIG. 3 (step S36-S38). In the case where the available capacity falls short to store all the third priority contents, one or more third priority contents are re-encoded as necessary so as to reduce their size and then to be recorded in the DVD.

Hereinafter, with reference to the examples shown in FIGS. 9A, 9B, 10A, 10B, 11A, 11B, and 12, description is given further to the processing of the flowchart shown in FIGS. 7 and 8 in detail.

Figure 9A:
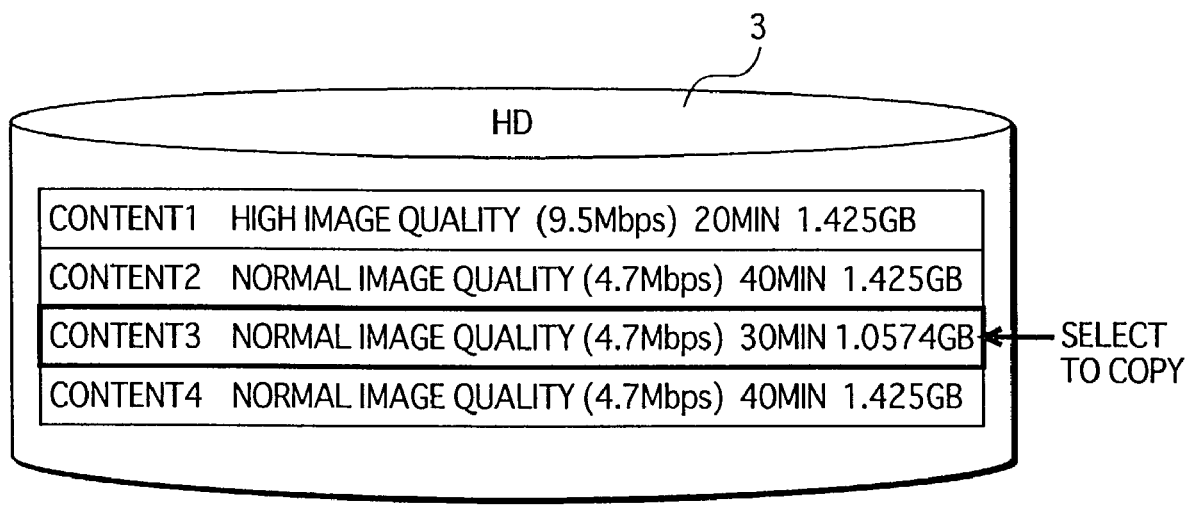
FIGS. 9A and 9B are views showing a process in which a first priority content is designated.
Figure 9B:
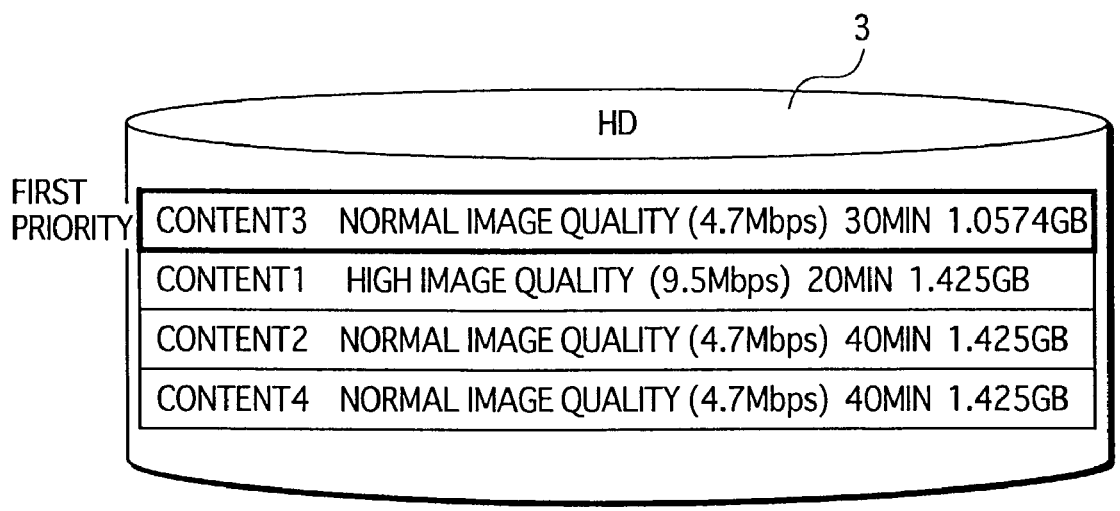

The seven figures: FIGS. 9A, 9B, 10A, 10B, 11A, 11B, and 12 collectively show, just like sequence photographs, one processing performed by the drive controller 15 according to the embodiment 2. FIGS. 9A and 9B illustrate the process in which a first priority content is selected.

In this specific example, four contents shown in FIG. 9A have been selected to be backed up. Of the four contents, the content 3 is selected, in the step S25, to be copied. Thus, the content 3 is assigned the first priority as shown in FIG. 9B. FIGS. 10A and 10B illustrate the process in which second priority contents and a third priority content are selected. Of the four selected contents, three contents that are not selected as the first priority content are subjected to the steps S26-S32. Of the three contents, contents not selected as the second priority content in these steps S26-S32 may be re-encoded. The four contents shown in FIG. 9A do not have the same size and the same reproduction time. The size of content 3 is 1.057 gigabytes, while the size of each of the contents 1, 2, and 4 is 1.425 gigabytes. Regarding the reproduction time, the content 1 is 20 minutes, the content 3 is 30 minutes, and each of the contents 2 and 4 is 40 minutes. Regarding the bit rate, each of the contents 2-4 is encoded at 4.7 Mbps, while the content 1 is encoded at 9.5 Mbps.

The available capacity left in the DVD after subtracting the size of the content 3 to be copied is calculated to be 3.643 gigabytes (=4.7 gigabytes−1.057 gigabytes). Then, to determine priorities of each remaining content, the bit rate B serving as the indicator is calculated in the step S27 as follows.

$$3.643 \text{ gigabytes} = 60(\text{sec}) \times 90(\min) \times B/8$$

$$\text{Indicator } B = 3.643(\text{GB}) \times 8/60(\text{sec}) \times 90(\min)$$

Accordingly, the indicator B is calculated to be 5.22 Mbps.

Once calculated, the indicator B is compared with the bit rate of each of the contents 2-4 as shown in FIG. 10A. The bit rate of both the contents 2 and 4 is 4.7 Mbps that is below the indicator B (5.22 Mbps). Accordingly, the contents 2 and 4 are assigned the second priority in the step S32. On the other hand, the bit rate of the content 1 is 9.4 Mbps that exceeds the indicator B (5.22 Mbps). Thus, the content 3 is not assigned the second priority but the third priority. FIG. 10B shows the contents arranged in the priority order. Each content is recorded to the DVD in the order shown in the FIG. 10B.

Figure 11B:
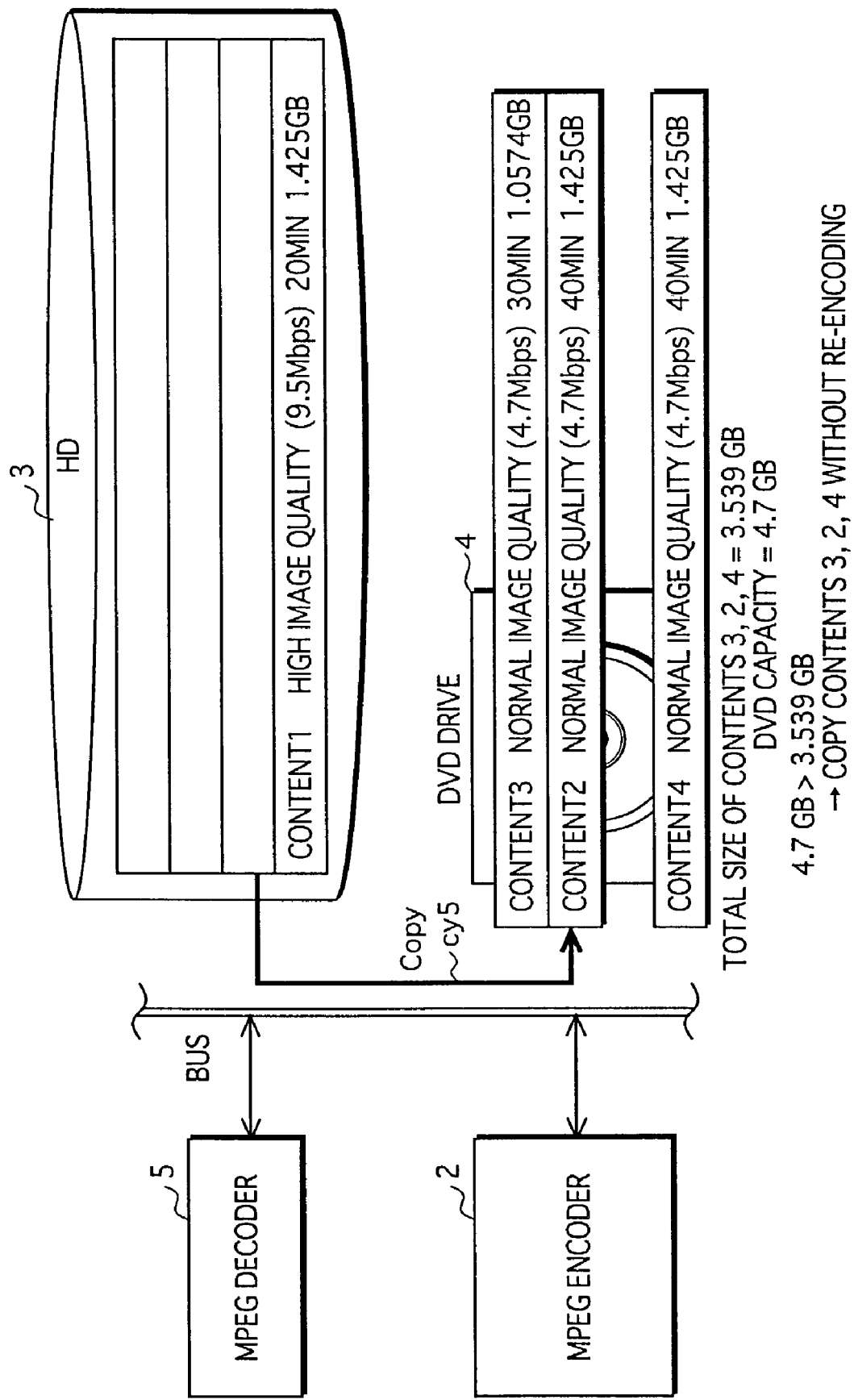

FIGS. 11A and 11B are views showing the contents arranged in the priority order and the DVD to which the contents are to be recorded. The total size of the content 2, the content 3, and the content 4 is 3.539 gigabytes (=1.425+ 1.057×2). Thus, there still is an available capacity left even after all the three contents are recorded in the DVD.

As shown in FIG. 11B, of the four contents, the content 2, the content 3, and the content 4 are sequentially copied to the DVD as indicated by an arrow cy5. As a result, the available capacity left in the DVD is 1.161 gigabytes (=4.7− (1.425+1.057×2))

Since the first priority content and the second priority contents are duly copied to the DVD, the content 1, which is the third priority content, is now subjected to the backup processing.

Figure 12:
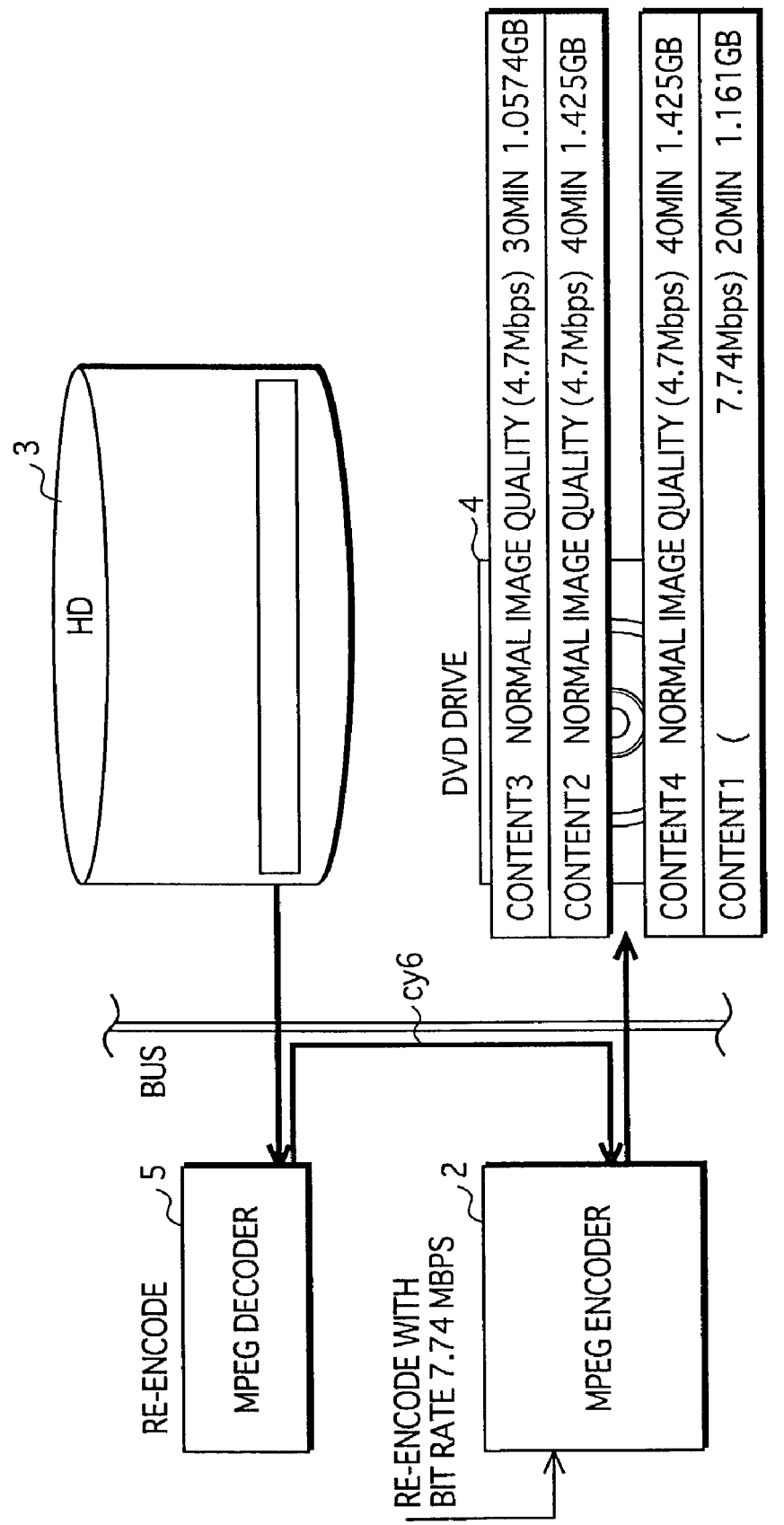
FIG. 12 is a view showing processing to re-encode and then record the third priority content which can not be copied due to insufficient capacity of the DVD.

FIG. 12 is a view illustrating the processing to re-encode and then record the third priority content which can not be copied to the DVD due to insufficient capacity of the DVD. The available capacity left in the DVD after storing the second priority contents is 1.161 gigabytes, which is not enough to copy the 1.425-gigabyte content 1. Thus, the content 1 is re-encoded.

Here, the content 1 of which reproduction time is 20 minutes needs to be recorded in the DVD with the above capacity. Thus, the bit rate to be allocated to the content 1 is calculated as follows.

$$1.161 \text{ GB} = 60(\text{sec}) \times 20(\text{min}) \times A/8$$

$$A = 1.161 \text{ GB} \times 8 / 60(\text{sec}) \times 20(\text{min})$$

$$A = 7.74 \text{ Mbps}$$

Once the bit rate is calculated, the content 1 is re-encoded and recorded in the DVD as indicated by an arrow cy6 in FIG. 12.

Although slightly lower than the original bit rate of 9.5 Mbps, the bit rate of 7.74 Mbps is still high in comparison with those of the contents 2-4. That is to say, the user's request to "save the content 1 with a possible highest quality" is satisfied.

When comparing, for reference purposes, the contents 1 and 4, both the contents 1 and 4 have an equal size of 1.425 gigabytes. Despite the equal size, the content 1 is selected as the third priority content because of its relatively high bit rate and relatively short reproduction time of 20 minutes. That is to say, the content 1 only requires a relatively short time to be re-encoded, and thus requires a relatively short time for the backup processing. However, in case that the user selects the content 1 having the highest bit rate is to be copied, the content 4 may alternatively be selected to be re-encoded. In that case, a longer time is required for re-encoding, but the content 1 is recorded in the DVD without any degradation in image quality.

As described above, the lowest priority is given to a content with a relatively high bit rate and thus with a relatively high image quality. Accordingly, a content to be re-encoded has a relatively short reproduction time but with relatively high bit rate, which results in a large content size. Since such a content is selected to be re-encoded, the content is greatly reduced in size with short processing time.

With this arrangement, the user is given an opportunity to reduce the size of the content that is recorded in the HD with an unintentionally high bit rate. That is, backup processing of contents is performed in a user-friendly manner.

Embodiment 3

According to the backup processing of the embodiments 1 and 2, contents are written into a DVD until the DVD is full. However, if contents are written until the DVD is full, no other content can be additionally written into the DVD. That is, there is no free space left in the DVD to record a content scheduled to be broadcast in the feature. In view of the above, the present embodiment allows a user to preserve a free space in a DVD prior to performing processing of the embodiments 1 and 2.

Figure 13:
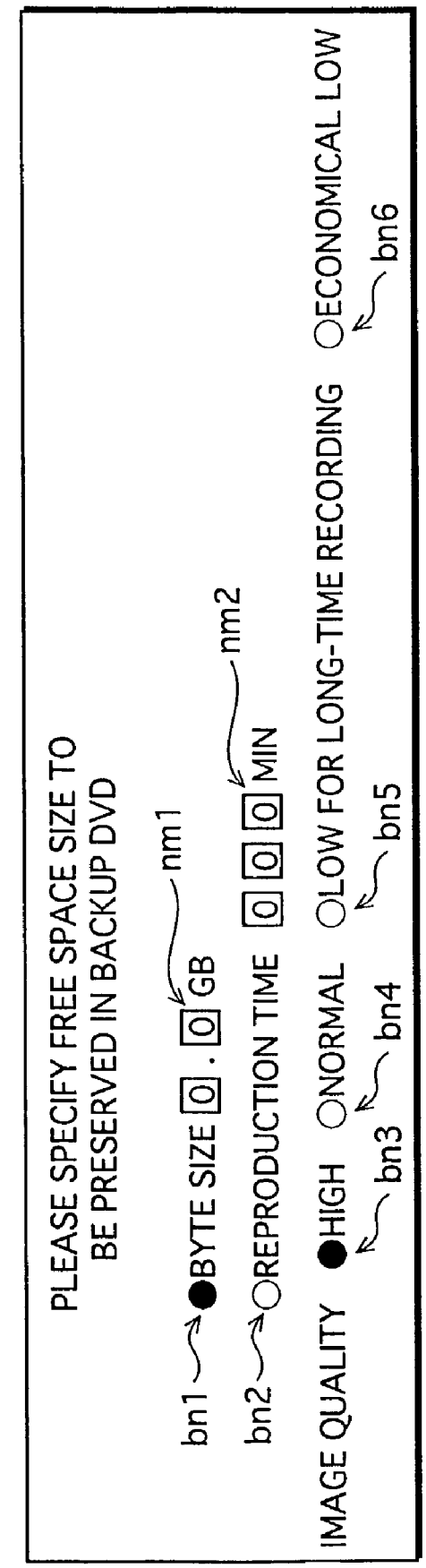
FIG. 13 is a view showing one example of a free-space preservation menu.

A user specifies a free space to be preserved using a free-space preservation menu shown in FIG. 13. FIG. 13 is a view showing one example of the free-space preservation menu. The free-space preservation menu includes: buttons bn1 and bn2 to select whether to specify the space to be preserved either by a byte size or by recording time; a column nm1 to input a numeric value specifying the byte size; a column nm2 to input a numeric value specifying the reproduction time in minutes; and buttons bn3, bn4, bn5, and bn6 for selecting one of the following four image qualities, 1.6 Mbps (economical low image quality), 2.4 Mbps (low image quality suitable for an extended period of recording), 4.7 Mbps (normal image quality), and 9.5 Mbps (high image quality). Input operations for the buttons and columns displayed in the free-space preservation menu are performed according to a flowchart shown in FIG. 14.

Figure 14:
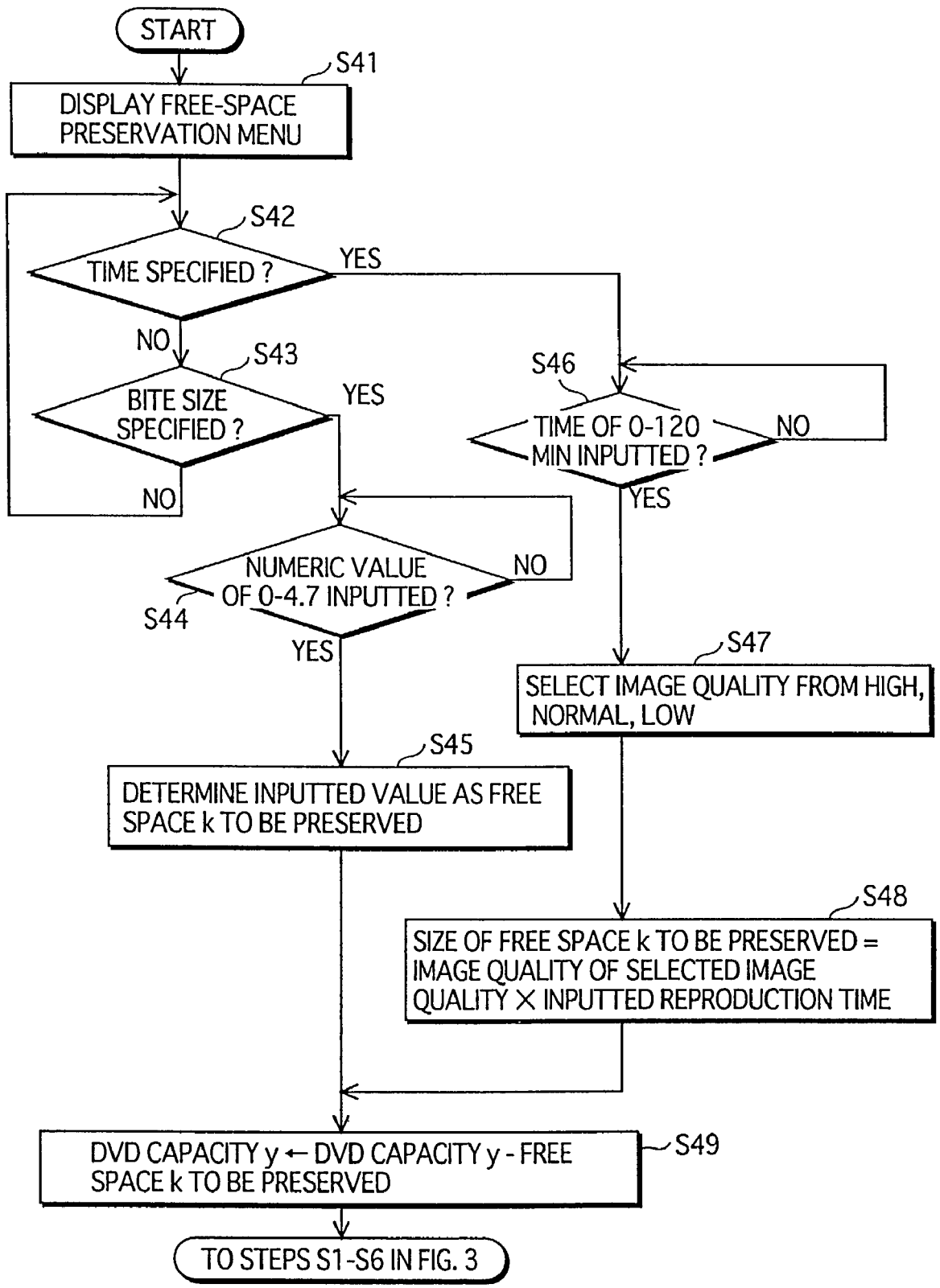
FIG. 14 is a flowchart showing processing performed by the drive controller 15 according to an embodiment 3.

FIG. 14 is a flowchart showing the processing performed by the drive controller 15 according to the embodiment 3. The processing shown in the flowchart is performed prior to the processing of the embodiments 1 and 2 shown in the respective flowcharts. According to the flowchart in FIG. 14, the drive controller 15 displays, in a step S41, the free-space preservation menu shown in FIG. 13, and then enters a loop to repeatedly perform steps S42 and S43. In response to a click on the button bn1 for specifying the free-space by a byte size (step S43), the column nm1 becomes active, so that a numeral value of 0-4.7 may be inputted (step S44). A value inputted to the column nm1 determines the size of the free space k to be preserved (step S45).

Alternatively, in response to a click on the button bn2 for specifying the free space by reproduction time (step S42), the column nm2 becomes active, so that a numeral value of 0-120 may be inputted (step S46). When such a value is inputted, buttons bn3-bn6 become active, so that either of the four image qualities maybe selected by a click on one of the buttons (step S47). Once the reproduction time and the image quality are specified, the drive controller 15 calculates the size of the free space k to be preserved by the following expression (step S48):

Size of Free Space $k$=Bit Rate of Specified Image Quality×Inputted Reproduction Time Once the size of the free space k is calculated, the drive controller 15 calculates the available capacity y of the DVD by the flowing expression:

Capacity $y$=Capacity $y$−Size of Free Space $k$

Then, processing shown in FIGS. 3, 7, and 8 are performed with the newly calculated DVD capacity y.

As described above, according to the present embodiment, when a user plans to record another content scheduled to be broadcast in the feature, a free space is preserved in the DVD to later record such a content.

Embodiment 4

The embodiments 1-3 describe the case where a plurality of contents stored in the HD is to be recorded in a single DVD. An embodiment 4 regards to an improvement in a technique to back up contents in a plurality of DVDs. Even when recording contents into a plurality of DVDs, there is a case where the total capacity of the DVDs fall short of the total size of contents selected to be backed up. In such a case, how much each content needs to be reduced differs depending on the combination of contents to be recorded in each DVD. By storing contents into each DVD in an appropriate combination, the bit rate allocated to a content does not have to be over-reduced. On the other hand, if contents are stored in each DVD in inappropriate combination, the bit rate is reduced more than actually required. In view of the above, the embodiment 4 discloses the processing to determine such a combination of contents to be recorded in each DVD that the influence resulting from re-encoding of contents is minimized.

Figure 15:
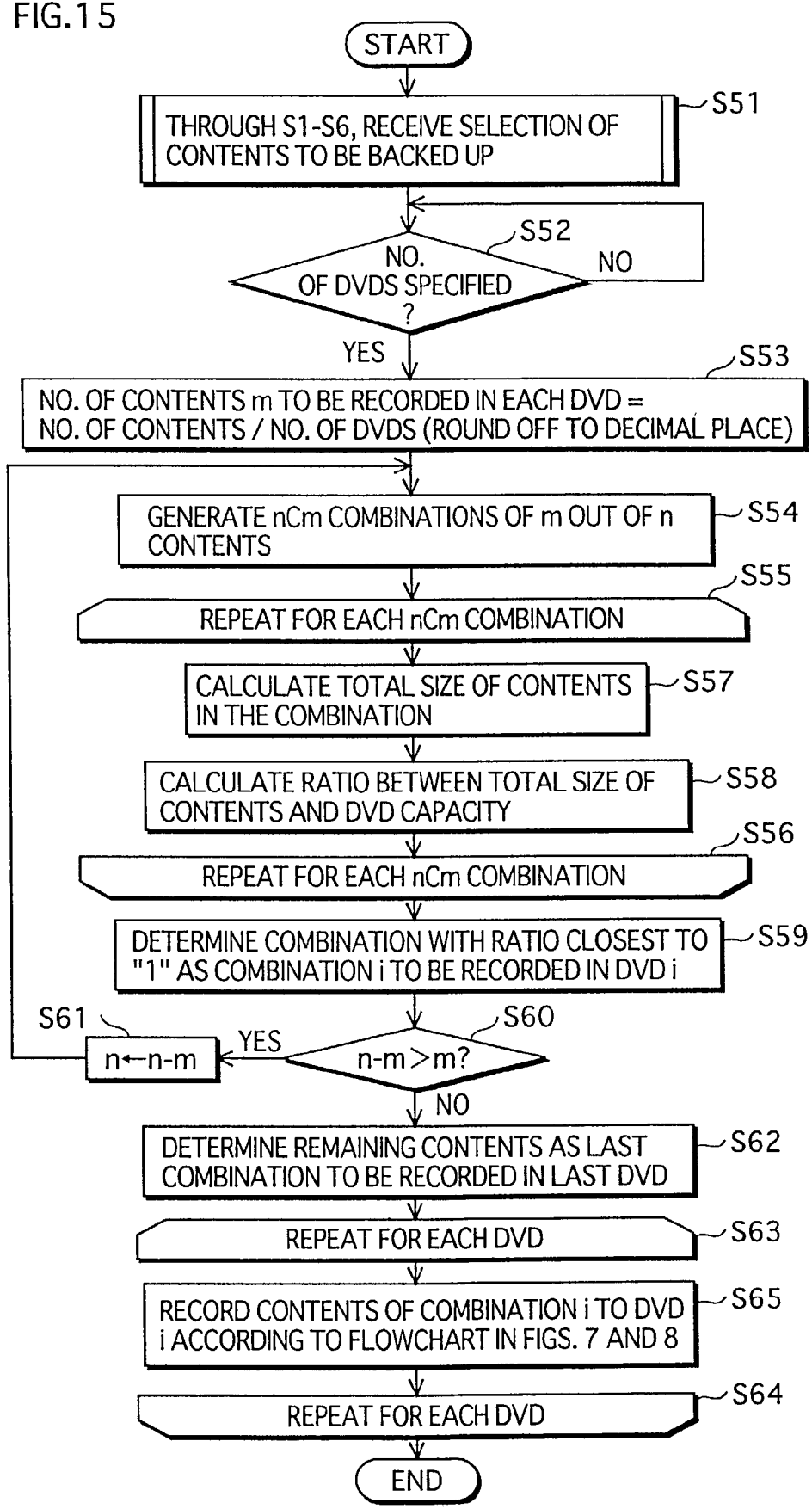
FIG. 15 is a view showing a flowchart of processing to determine the combination of contents to be recorded in each DVD.

FIG. 15 is a view showing a flowchart of the processing to determine the combination of contents to be recorded in each DVD.

In a step S51 of the flowchart, the GUI controller 17 receives selection of contents to be backed up. The selection is made through the steps S1-S6 shown in FIG. 3. When contents to be backed up are selected, the GUI controller 17 receives, in a step S52, an instruction specifying the number of DVDs to be used. In a step S53 that follows, the drive controller 15 divides the number of selected contents by the number of DVDs to be used, and rounds off the calculation result to the decimal place, thereby obtaining the number m of contents to be written in each DVD. Thereafter, in steps S54-S64, the drive controller 15 determines a combination i of contents to be recorded in a DVD i, which is one of the plurality of DVDs.

The determination is made by making nCm different combinations of m contents out of n contents selected to be backed up (step S54), followed by the loop for repeatedly performing steps S55-S58.

In the loop, the drive controller 15 first calculates the total size of the contents included in a currently targeted combination (step S57), and then calculates a ratio between the total size and the available capacity of a DVD (step S58), and repeats the two steps for each of the nCm combinations. Once the ratios for all the combinations are calculated, the drive controller 15 determines, in a step S59, the combination of which ratio is closest to the value 1 as the combination i of contents to be recorded in the DVD i. Here, there may be a combination of which ratio exceeds 1 or below 1. To be selected in the step S59 is the combination of which ratio is closest to 1 regardless of whether the ratio exceeds or below 1.

Once the combination of contents to be recorded in a first DVD is determined, the drive controller 15 judges, in a step S60, whether the value obtained by "n−m" exceeds the number m of the contents. If the judgment results in affirmative, the drive controller 15 replaces, in a step S61, the number n with the value obtained by subtracting the number m from the number n, and then perform a next iteration of the loop with the newly calculated number n. This is to select, from the remaining contents to be backed up, another combination of m contents to be recorded in a next DVD.

The above steps S54-S61 are repeated until "n−m" is below the number m. The value of "n−m" represents the number of remaining contents. When the value of "n−m" is below the number m, it means that there remains only one possible combination to be recorded in a DVD. Thus, the combination is determined as the last combination to be recorded in the last DVD, and then the processing goes onto a step S63. Steps S63 and S65 are to repeat a step S64 for each of the plurality of DVDs. Here, a DVD targeted to the current iteration is denoted as the DVD i. In the step S56, contents included in the combination i that corresponds to the DVD i are recorded in the DVD i. Recording of each content into the DVD i is performed according to the processing shown in FIGS. 7 and 8. That is to say, each content is assigned a priority, and then copied or re-encoded according to their priorities.

Now, description is given to the processing of the flowchart in FIG. 15 with reference to a specific example shown in FIGS. 16A, 16B, and 16C. FIGS. 16A, 16B, and 16C collectively show, just like sequence photographs, the processing performed according to the embodiment 4.

FIG. 16A shows how many DVDs are to be used to record five contents A-E. As shown in the figure, in this example, the contents A-E stored in the HD are to be recorded in three DVDs. According to this example, the number n of the contents is 5, and the number of DVDs is 3, and calculation performed in the step S53 is 5/3 so that the result obtained from the calculation is 1.6666. The calculation result is rounded off to the decimal place, and thus m=2.

In the step S54 that follows, ten possible combinations of two contents out of five contents are made.

To be more specific, the ten combinations (=5C2) include A and B, A and C, A and D, A and E, B and C, B and D, B and E, A and E, and so on.

Once all the possible combinations are made, the ratio of the total size to the available capacity of a DVD is calculated for each combination in the step S58.

The ratio of the combination of A and B is 5.4/4.7.
The ratio of the combination of A and C is 3.6/4.7.
The ratio of the combination of A and D is 4.9/4.7.
The ratio of the combination of A and E is 5.6/4.7.
The ratio of the combination of B and C is 4.8/4.7.
The ratio of the combination of B and D is 6.1/4.7.
The ratio of the combination of D and E is 6.3/4.7.

Closest to the value 1 among the above ratios is of the combination of the contents B and C, so that the contents B and C are determined, in the step S59, to be recorded in the first DVD. Then, the comparison is made in the step S60. In this case, the value of n−m is three (=5−2), which is still larger than m. Accordingly, n is replaced with three (=5−2) in the step S61, and then the processing moves back to the step S54.

In the step S54, all the possible combinations, three combination in this case, of two contents out of three contents A, D, F are made. Then, the ratio of each combination is calculated.

The ratio of the combination of A and D is 4.9/4.7.
The ratio of the combination of D and E is 6.3/4.7.
The ratio of the combination of A and E is 6.3/4.7.

Closest to the value 1 among the three ratios is of the combination A and D, so that the contents A and Dare determined, in the step S59, to be recorded in the second DVD.

In the step S60 that follows, comparison is made between the value of n−m and the value m. In this case, the value of n-m is one (=3-2), which is smaller than m. Accordingly, the processing moves from the step S60 to the step S62 where the remaining content E is determined to be the last combination to be recorded in the third DVD.

FIG. 16B is a view showing the combinations of contents A-E to be recorded in each DVD. As shown in FIG. 16C, each contents included in the combinations is sequentially recorded in a respective one of the three DVDs, whereby backup of contents is completed.

FIG. 16C shows the process in which contents are copied to DVDs in the determined combinations shown in FIG. 16B.

As described above, according to the present embodiment, when contents are to be recorded in a plurality of DVDs, contents to be recorded in each DVD are determined so that each combination results in the size of which ratio to the DVD capacity is closest to the value 1. With this arrangement, reduction in image quality resulting from re-encoding is minimized.

Embodiment 5

Figure 17:
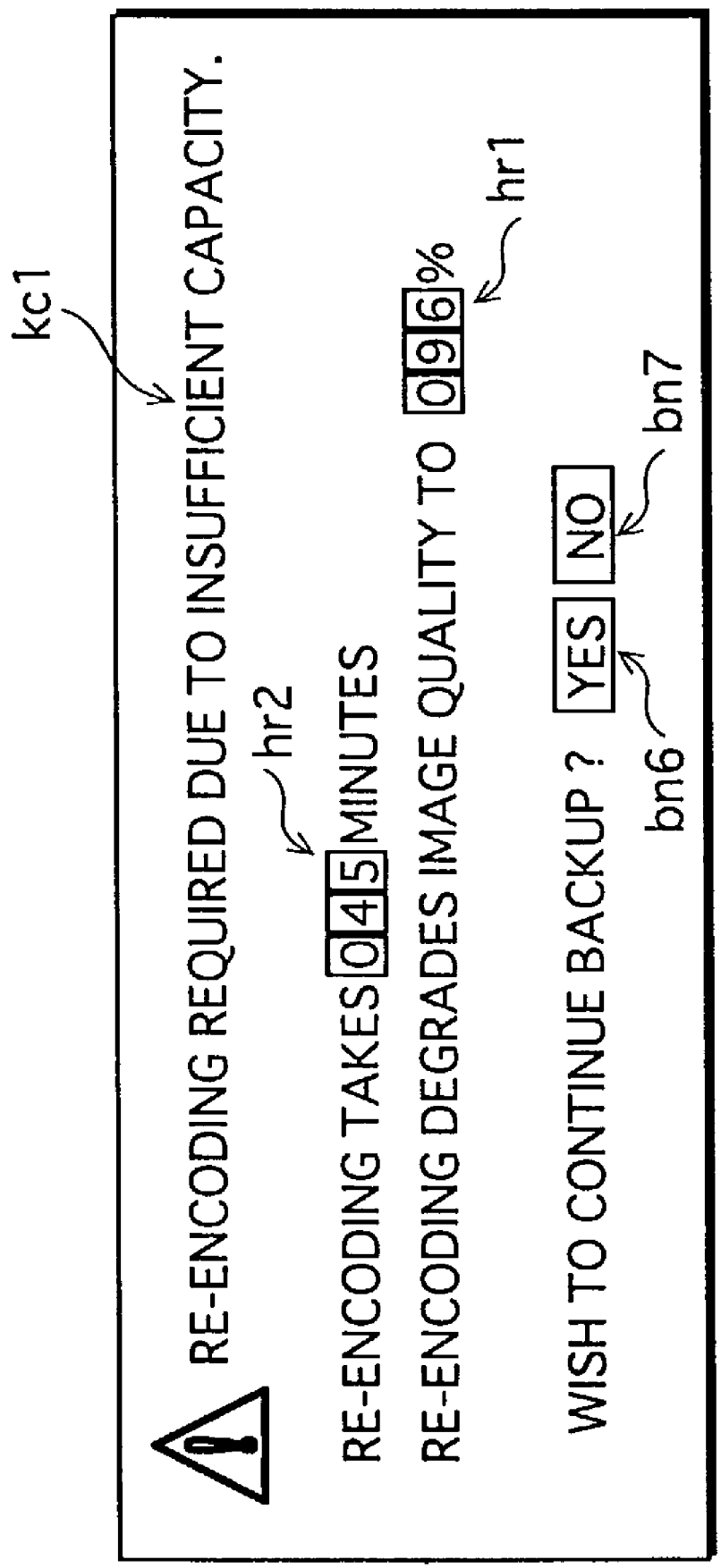
FIG. 17 is a view showing one example of a menu displayed to inform a user that a lower bit rate will be allocated and to prompt the user to decide whether to perform recording of a content despite the expected image quality degradation.

In the embodiments 1-4, contents are re-encoded as necessary without specific user instructions. In the embodiment 5, however, the user is informed that the bit rate is reduced upon re-encoding, and asked whether to proceed further although the image quality needs to be degraded to some extent. FIG. 17 shows a menu displayed to prompt a user to make such a decision. The menu shown in FIG. 17 includes: a warning message kc1 informing the user that re-encoding must be performed in order to complete the backup processing; a degradation ratio hr1 showing to what extent the image will be degraded; time hr2 required for re-encoding, and buttons bn6 and bn7 for receiving user input as to whether to complete the backup processing. The degradation ratio is obtained by dividing the bit rate calculated in the step S14 of the flowchart shown in FIG. 3 by the bit rate originally allocated to the content. The degradation ratio in the example shown in FIG. 17 is 0.96 that is calculated from the example bit rates shown in FIG. 6B (0.96=4.526 Mbps/4.7 Mbps).

Further, the time required for re-encoding is equal to reproduction time of the content to be re-encoded. That is, the reproduction time of the content 3 shown in FIG. 6B is 45 minutes, and thus it takes 45 minutes to re-encode the content. The time required for re-encoding is informed to the user in order to ask for consent of the user.

The degradation ratio is calculated after the bit rate is calculated in the step S14 shown in FIG. 3, and the menu including the degradation ratio is displayed. By displaying the menu, even if a user is not familiar with technical meanings of re-encoding or bit rate, the user is allowed to intuitively recognize to what extent the image quality will be degraded. In response to a user operation to the menu so as to instruct to proceed further, the re-encoding is performed in the step S15. Alternatively, in response to a user operation so as to instruct not to perform re-encoding, the backup processing is cancelled.

Figure 18:
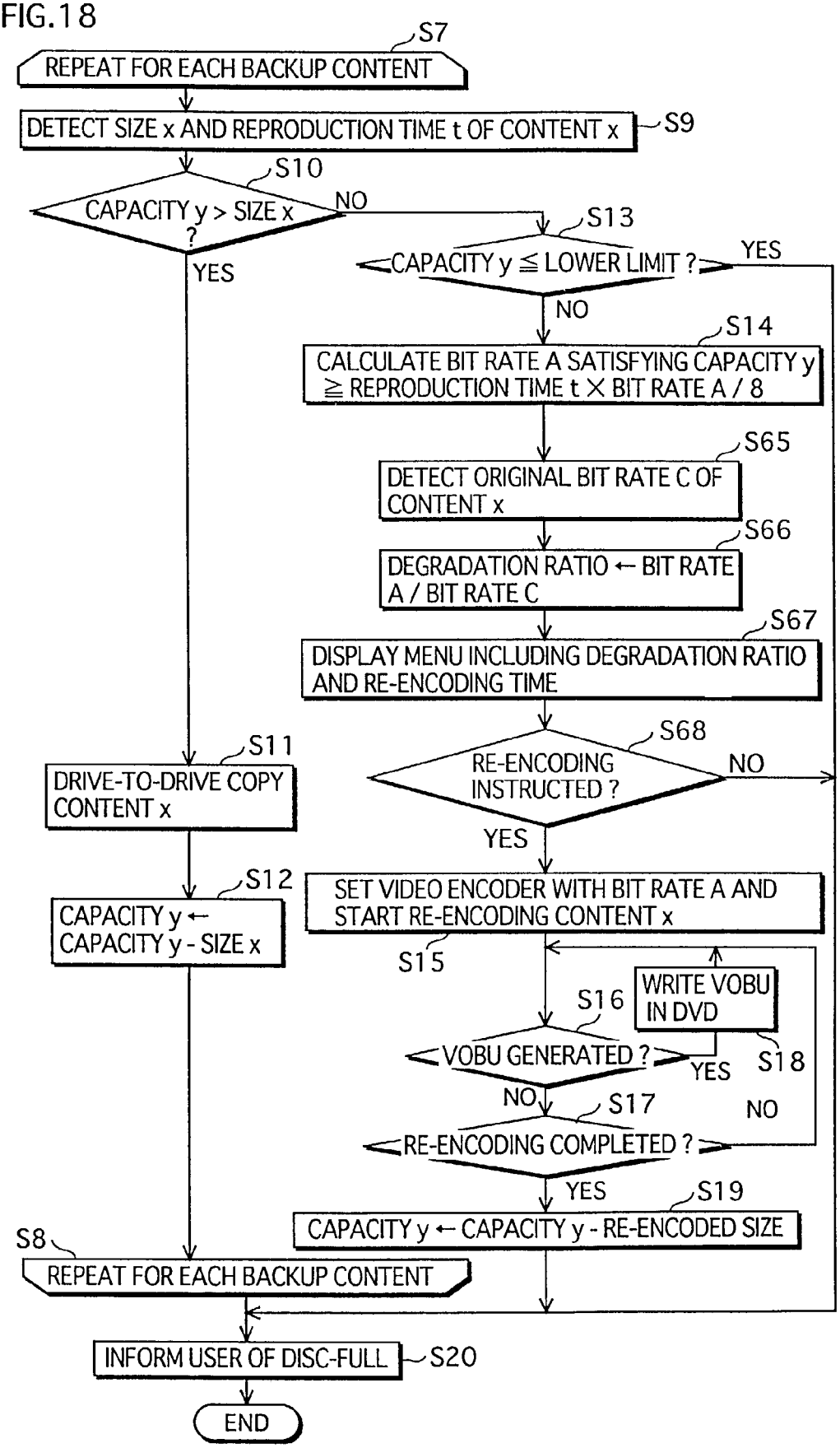
FIG. 18 is a flowchart showing the processing performed according to an embodiment 5 by the drive controller 15.

Next, description is given to processing performed according to the embodiment 5 by the drive controller 15. FIG. 18 is a flowchart showing the processing performed according to the embodiment 5 by the drive controller 15. The flowchart is a modification of the flowchart shown in FIG. 3. The difference between the two flowcharts are found in steps S65-S68 performed after calculating the bit rate A in the step S14 and before starting the re-encoding in the step S15. That is, after the bit rate calculator 16 calculates, in the step S14, the bit rate A satisfying the expression: Capacity y≧Reproduction Time t×Bit Rate A/8, the drive controller 15 detects, in the step S65, a bit rate C that has been originally allocated to the content x. In the step S66 that follows, the drive controller 15 calculates the degradation ratio by calculating the bit rate A/the bit rate C. Once the degradation ratio is calculated, the drive controller 15 displays, in the step S67, the menu as shown in FIG. 17 with the degradation ratio and the reproduction displayed therein, and waits for the user input to a button to determine, according to the input, whether the user agrees to re-encode the content or not. In the case the user agrees to re-encode the content, the drive controller 15 instructs the MPEG encoder 2, in the step S15, to start re-encoding the content at the bit rate A. Alternatively, in the case that the user does not agree to re-encode the content, the drive controller 15 performs the step S20 thereby to inform the user that the disc is full.

As described above, according to the present embodiment a user is informed of, prior to re-encoding being performed, the degree of degradation in resulting image quality and the time required for re-encoding. Thus, the user has an option to cancel the backup processing if the bit rate at which a content will be re-encoded appears to be too low. That is, the backup processing is performed in compliance with user's requests.

Embodiment 6

According to the embodiment 1, among the contents selected to be backed up, the last content is recorded in the available capacity left in the DVD after the other contents are copied. Thus, the last content may be greatly reduced in size as it is the only content subjected to re-encoding. In view of the above, according to the embodiment 6, a plurality of contents is equally reduced.

In the embodiment 6, upon receipt of selection of a plurality of contents to be backed up, the drive controller 15 judges, prior to performing backup processing of the selected contents, whether the capacity of the DVD exceeds the total size of all the selected contents. In the case there is enough capacity left in the DVD, all the selected contents are copied without re-encoding.

On the other hand, in the case there is not enough capacity left in the DVD, all the selected contents are re-encoded prior to being written in the DVD. To determine the bit rate for re-encoding, the ratio between the total size of the selected contents and the capacity of the DVD is first obtained. Then, the bit rate originally allocated to each content is multiplied by the obtained ratio. Each selected content is then re-encoded at the thus calculated bit rate.

Figure 19:
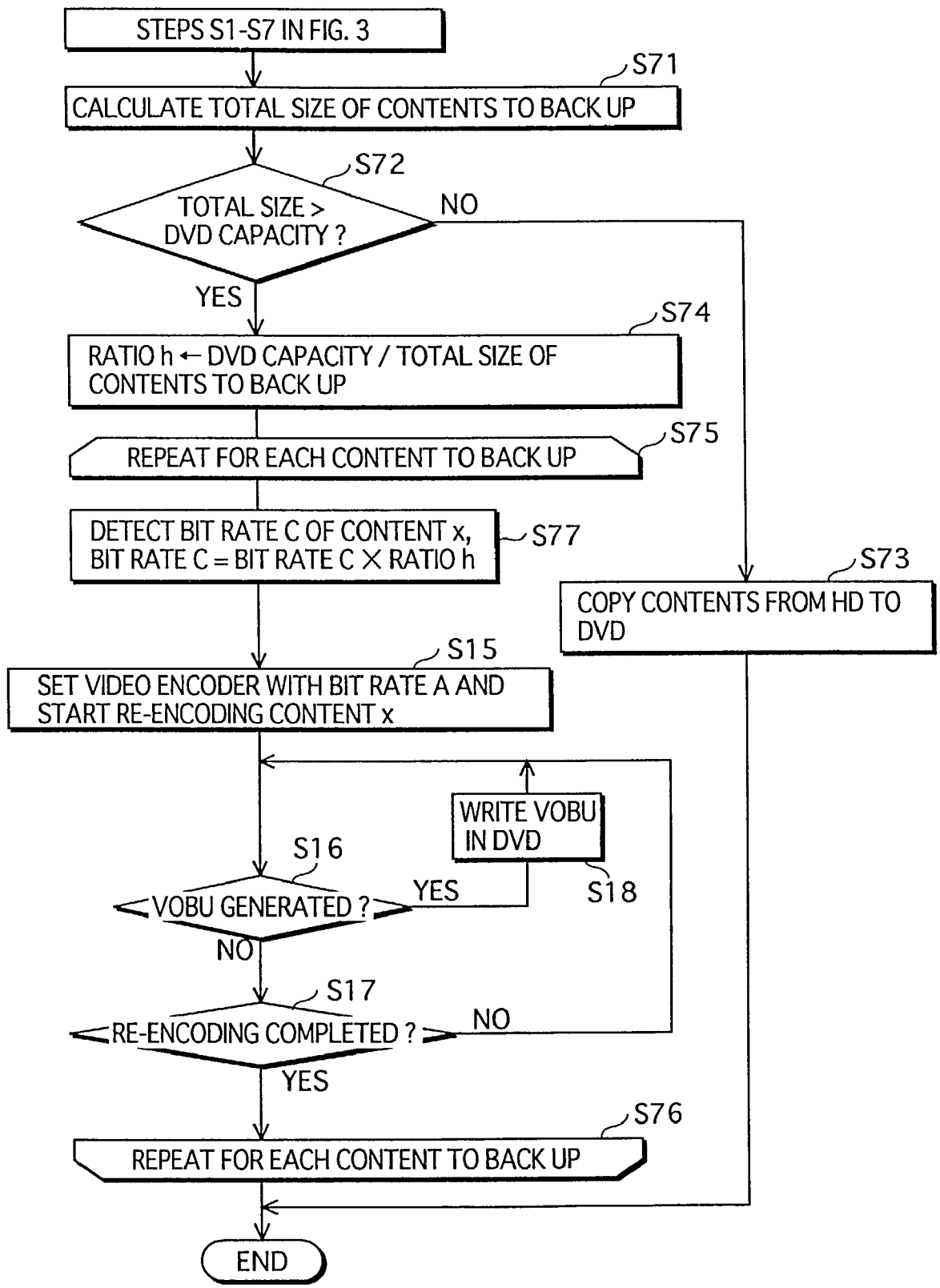
FIG. 19 is a view showing a flowchart of the processing performed according to an embodiment 6 by the drive controller 15.

FIG. 19 is a view showing a flowchart of the processing performed according to the embodiment 6 by the drive controller 15. The processing shown in the flowchart is performed after the steps S1-S7 shown in FIG. 3. The drive controller 15 calculates, in a step S71, the total size of the selected contents, and judges, in a step S72, whether the total size exceeds the capacity of the DVD. In the case where the total size is smaller than the capacity, the drive controller 15 copies, in a step S73, the selected contents stored in the HD to the DVD to complete the backup processing. On the other hand, in the case where the total size exceeds the capacity, the drive controller 15 calculates, in a step S74, the ratio h by the expression "Free Space of DVD/Total Size of Contents to be Backed Up", and then moves onto the loop for repeatedly performing the steps S77 followed by the steps S15-S18. The content targeted to the current iteration is referred to as a content x. In the step S77, the bit rate C of the content x is detected and replaced with a newly calculated bit rate C by the expression "Bit Rate C×Ratio h". In the step S15, the drive controller 15 changes the bit rate setting of the video encoder 9 to the bit rate C, and then instructs the MPEG encoder 2 to start re-encoding of the content x. As a result, the processing enters the loop for repeatedly performing the steps S16-S18. Through the above processing, each content selected to be backed up is sequentially written into the DVD.

Figure 20:
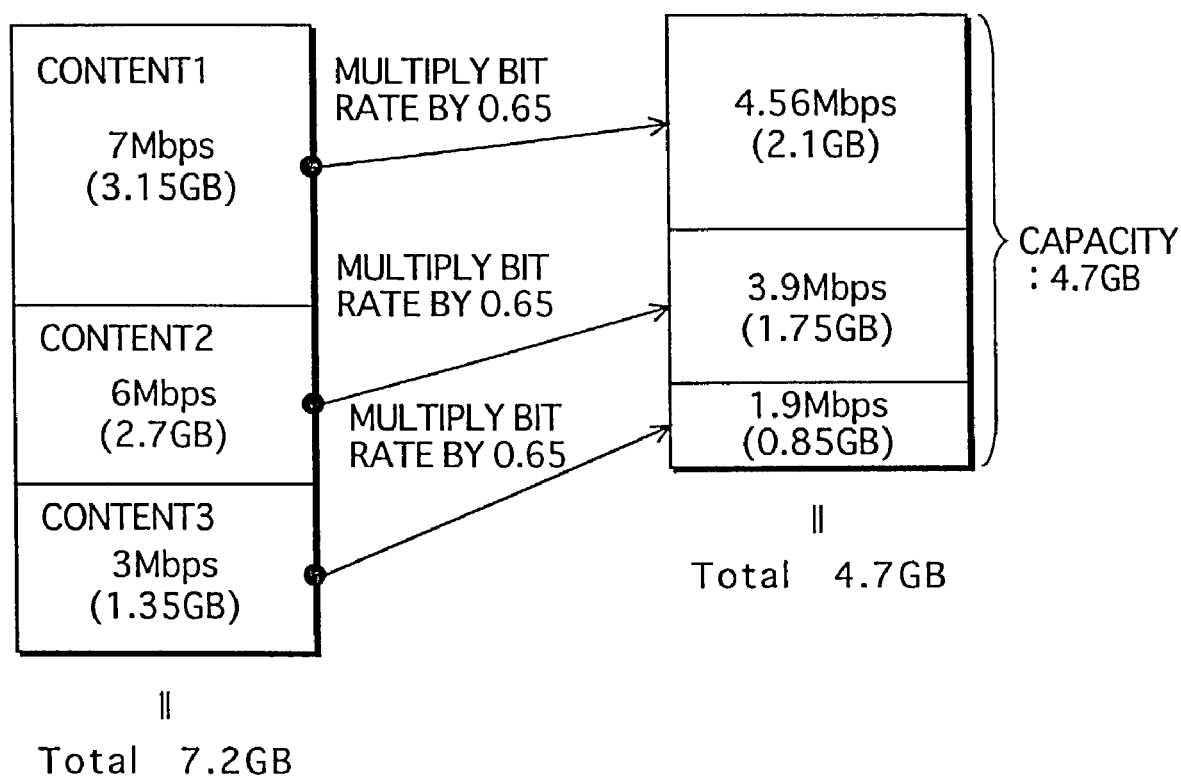
FIG. 20 is a view showing the process in which three contents 1-3 are recorded in the DVD according to the processing of the embodiment 6.

Now, by way of the example shown in FIG. 20, description is given to the processing performed according to the embodiment 6 by the drive controller 15. FIG. 20 shows the process in which three contents 1-3 are recorded in the DVD. The three contents 1-3 shown in FIG. 20 have uniform reproduction time of 20 minutes and have been encoded at bit rates of 7 Mbps, 6 Mbps, and 3 Mbps, respectively. When the three contents are selected to be backed up, the total size of the three contents is compared with the capacity of the DVD. Here, the total size of the contents 1-3 is 7.2 gigabytes (=7(Mbps)×60(min)×60(sec)/8+6(Mbps)×60(min)×60(sec)/8+3(Mbps)×60(min)×60(sec)/8), which exceeds the capacity of the DVD. Thus, it is judged that all the contents can not be copied (step S72).

Consequently, the contents need to be re-encoded. To perform re-encoding, the drive controller 15 calculates the ratio between the total size of the contents 1-3 (7.2 gigabytes) and the capacity of the DVD, thereby obtaining the ratio of 0.65. The drive controller 15 then multiplies the bit rate of each of the contents 1-3 by the ratio. As a result, the contents 1-3 are re-encoded at the reduced bit rate to be smaller in size prior to being recorded in the DVD (steps S74-S77, steps S15-S18). To be more specific, the bit rate of the content 1 is reduced from 7 Mbps to 4.56 Mbps (=0.65×7 Mbps) and thus the size is reduced to 2.1 gigabytes. The bit rate of the content 2 is reduced from 6 Mbps to 3.9 Mbps (=0.65×6 Mbps) and thus the size is reduced to 1.75 gigabytes. The bit rate of the content 3 is reduced from 3 Mbps to 1.9 Mbps (=0.65×3 Mbps) and thus the size is reduced to 0.85 gigabytes.

As described above, according to the present embodiment, all the contents to be backed up are re-encoded prior to being recorded in the DVD. The backup processing thus takes a relatively long time but image quality reduction in each content is minimized as all the content are uniformly reduced in size.

Figure 21:
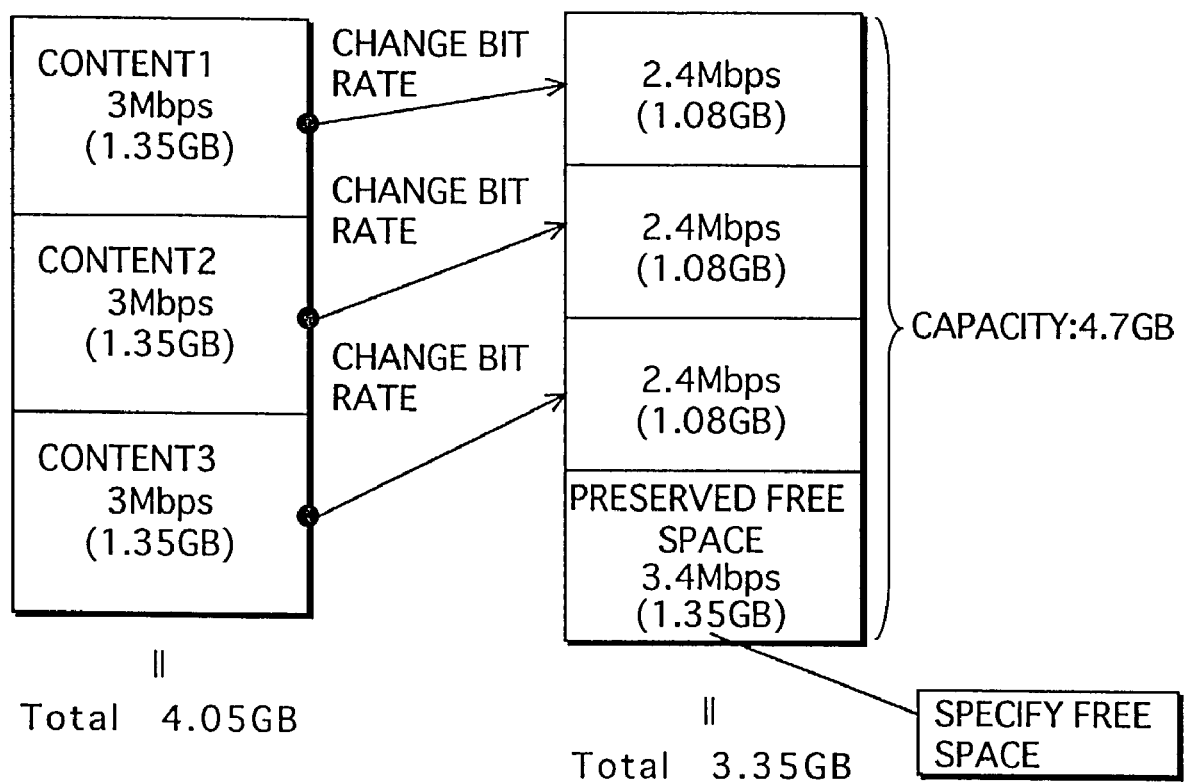
FIG. 21 is a view showing a modification of the processing according to the embodiment 6.

Note that the processing according to the embodiment 3 may be applied to the embodiment 6. In the embodiment 3, a user is allowed to request to preserve a free space in a DVD for later recording a content, and the backup processing is performed after preserving the requested free space in the DVD. With this preservation processing applied to the present embodiment, a user may request to preserve a certain amount of free space in the DVD. In response, the requested size is subtracted from the capacity of the DVD, and the remaining capacity is compared with the total size of the contents selected to be backed up. In the case where the total size exceeds the remaining capacity, the ratio between the remaining capacity and the total size is calculated. By multiplying the bit rate of each selected content by the calculated ratio, the bit rate for re-encoding is calculated, and each content is re-encoded at the calculated bit rate. FIG. 21 shows the processing according to the embodiment 6 to which the embodiment 3 is applied. As shown in the figure, the capacity of the DVD is 4.7 gigabytes, and 1.35 gigabytes thereof is preserved at a user request. The 1.35-gigabyte capacity is large enough to store a 60-minute content at 3.4 Mbps bit rate (=1.35=(3 Mbps×60(min)×60(sec)/8). Since the requested free space is preserved, the remaining capacity of the DVD is now 3.35 gigabytes (=4.7−1.35), and the contents 1-3 are to be recorded in the remaining capacity. The total size of the contents 1-3 is 4.05 gigabytes, which exceeds the remaining capacity. Thus, the ratio between the remaining capacity and the total size of the contents 1-3 is calculated, thereby obtaining the ratio of 0.827 (=3.35/4.05). Thus, the bit rate of each of the contents 1-3 is multiplied by 0.827. Each content is then re-encoded at the calculated bit rate and recorded in the DVD.

According to the above processing, all the contents selected to be backed up are reduced prior to being recorded and the requested free space is preserved for future recording.

Figure 22:
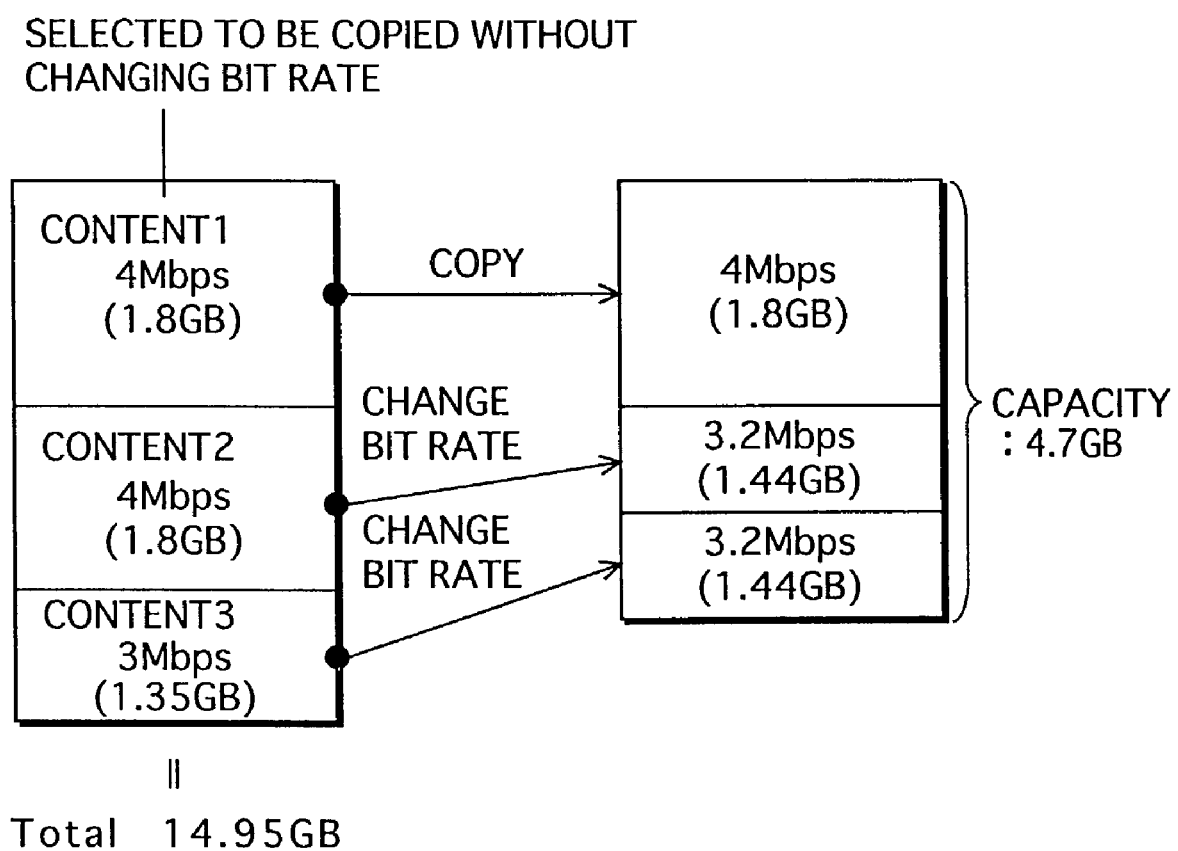
FIG. 22 is a view showing another example modification of the processing according to the embodiment 6.

Further, the processing according to the embodiment 2 may be applied to the embodiment 6. To be applied to the present embodiment is the processing for allowing a user to select contents to be copied. The contents selected to be copied are recorded in the DVD without re-encoding, while the other contents are recorded after being re-encoded at bit rates that are uniformly reduced from their original bit rates. FIG. 22 is a view showing the processing according to the embodiment 6 to which the embodiment 2 is applied. As shown in the figure, the content 1 is selected by a user to be copied. In response, 1.8 gigabytes corresponding to the size of content 1 is subtracted from 4.7 gigabytes, which is the capacity of the DVD. Accordingly, the remaining capacity is calculated to be 2.8 gigabytes (=4.7−1.8), and the judgment is made to determine whether the remaining contents can be copied. In this case, the total size of the remaining contents (the contents 1 and 2) is 3.15 gigabytes (=1.8+1.35), which exceeds the remaining capacity of 2.9 gigabytes. Consequently, the ratio between the total size of the contents to be backed up and the remaining capacity of the DVD is calculated, thereby obtaining the ratio of 0.92 (=2.9/3.15). The bit rate 4 Mbps of the contents 2 and 3 is multiplied by the calculated ratio of 0.92 to obtain the bit rate 3.68 Mbps (=0.92×4 Mbps). The contents 2 and 3 are re-encoded at the calculated bit rate, and then recorded in the DVD. With this processing, a specific content is not subjected any image quality degradation while the other contents selected to be backed up are equally reduced.

Embodiment 7

An embodiment 7 is directed to a modification of the embodiment 1 by applying edit functions thereto. Edit functions provided for a user include dividing of a content. In the embodiment 7, when it is judged that a content to be backed up can not be recorded in a DVD, a user is allowed to activate the edit functions to perform editing to divide the content. To be more specific, the user is allowed to specify a location at which the content is to be divided. The dividing location of the content is represented by the reproduction time counted from the beginning of the content, and the content is divided into two before and after the location corresponding to the specified time.

Then, judgment is made to determine whether a first half of the content is below the capacity of the DVD. If the size of the first half is bellow the capacity, the first half is copied to the DVD without re-encoding. If the size of the first half exceeds the capacity, the half is re-encoded so as to be recorded in the DVD. Since the content to be re-encoded is a half of the original content, time taken for re-encoding is shorter and degradation of the image quality is smaller in comparison to those resulting from re-encoding the whole content With this processing, the backup processing to the first DVD is completed more quickly than the processing performed without dividing the content.

Thereafter, the other half of the content is now treated as one content and selected to be recorded in a second DVD. The backup processing is completed through the similar processing.

Figure 23:
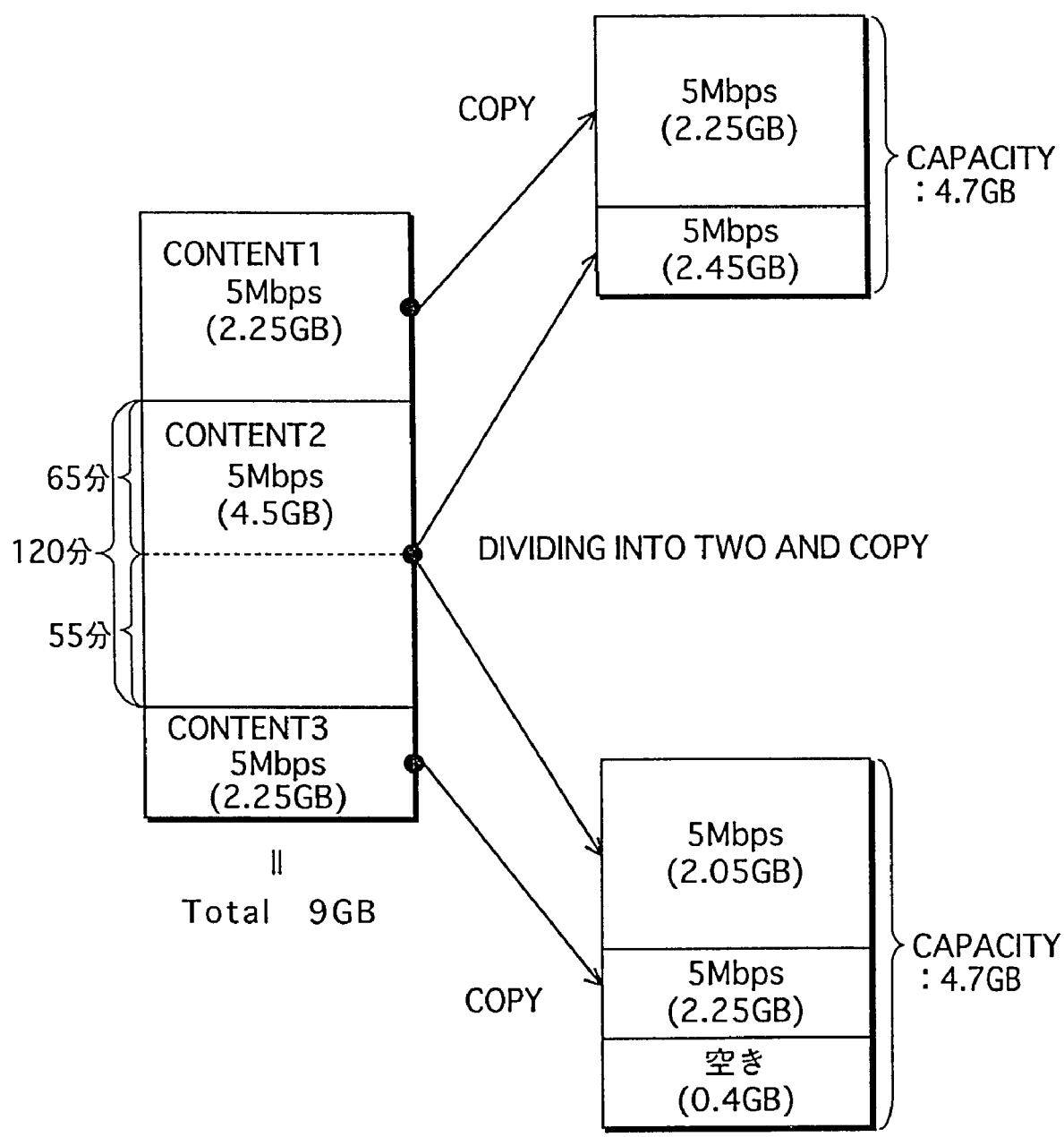
FIG. 23 is a view showing processing according to an embodiment 7.

Hereinafter, description is given to the processing according to the embodiment 7 by way of a specific example shown in FIG. 23. As shown in the figure, the reproduction time of the content 2 is 120 minutes and the size is 4.5 gigabytes, while the size of the content 1 is 1.35 gigabytes. Thus, the contents 1 and 2 can not be recorded together in one DVD. Here, a user activates the edit functions to specify a location at which the content 2 is to be divided into two. Here, the user specifies a location corresponding to about 65 minutes of reproduction time started from the beginning. In response, the first half of the content 2 corresponding to 2.45 gigabytes (5(Mbps)×65(min)×60(sec)/8) is recorded into the first DVD along with the content 1. The other half of the content corresponding to 55 minutes of reproduction time is recorded in the second DVD along with the content 3.

As described above, according to the present embodiment, at the time it is judged that contents to be backed up cannot be recorded in one DVD, a user is allowed to divide a content. Dividing a content achieves that time taken for re-encoding is shorter and thus adverse influence on the image quality is smaller in comparison with the processing performed without dividing the content. Note that although a content is divided in the present invention, it is also applicable to partially delete a content. That is, in the case where contents to be backed up can not be recorded in one DVD, a user may activate the edit function to partially delete a content. If the content size resulting from the partial deletion is below the capacity of the DVD, the undeleted part of the content is copied without re-encoding. On the other hand, if the content size still exceeds the capacity, the undeleted part of the content is re-encoded prior to being recorded in the DVD.

Embodiment 8

In the embodiments 1-7, the description is given on the assumption that contents are composed solely of VOBS. In an embodiment 8, description is given to an improvement in backup processing with management information taken into account. Each piece of management information corresponds to a content, and includes reproduction route information and VOB information. When there is a plurality of contents, there is a plurality of pieces of management information. The plurality of pieces management information is all collectively contained in a single file called a management file and stored in the HD or a DVD.

Figure 24:
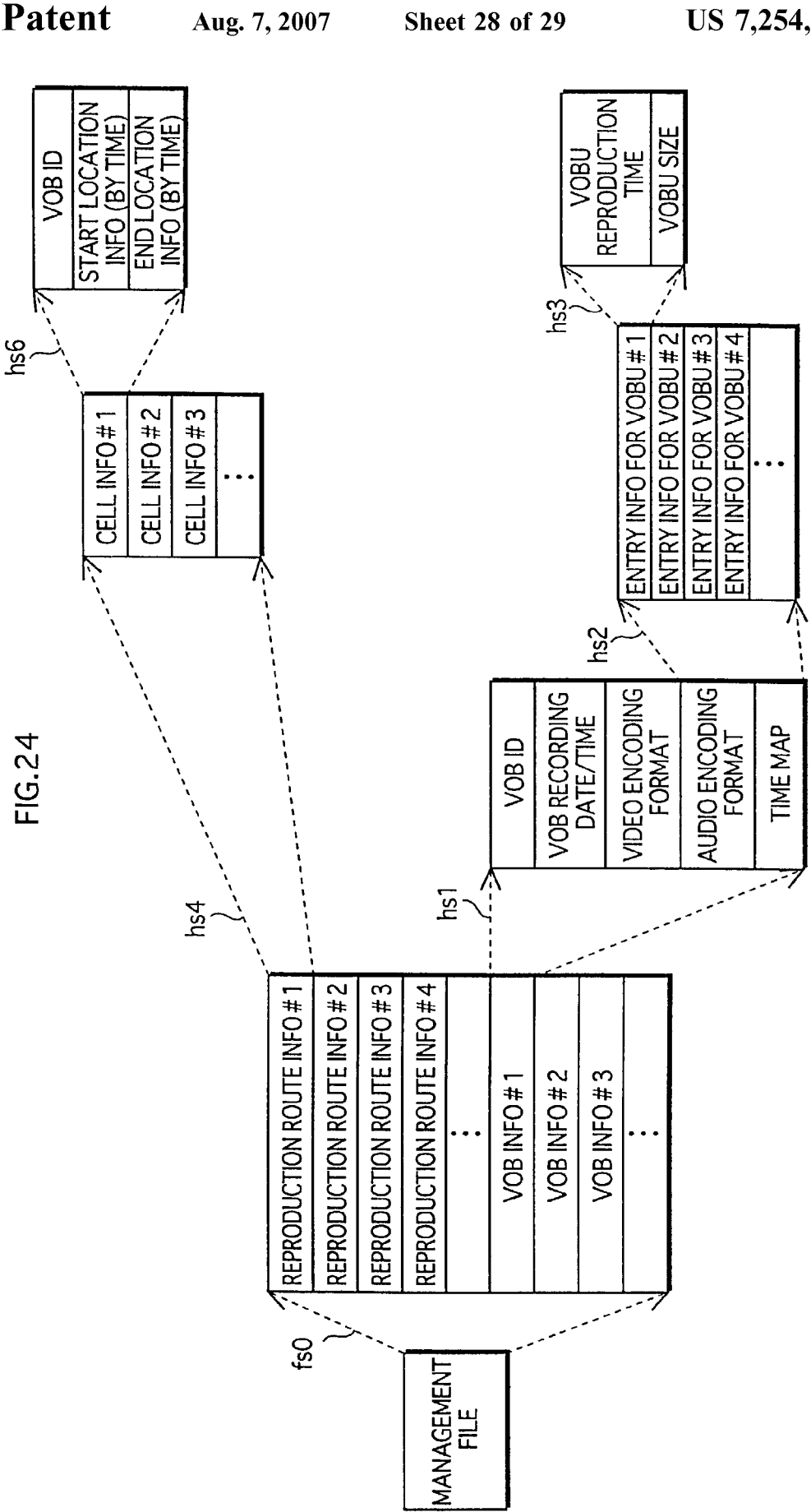
FIG. 24 is a view showing the internal construction of a management file.

Now, description is given to the internal construction of the management file. FIG. 24 is a view showing the internal construction of the management file. As shown in the figure by a broken line arrow fs0, the management file is composed of a plurality of pieces of VOB information (VOB information #1, #2, #3, . . . ), and a plurality of pieces of reproduction route information (reproduction route information #1, #2, #3, . . . ). Each piece of "VOB information #1, #2, #3 . . . " shows detailed information regarding a corresponding one of the VOBs stored in the DVD. In the figure, the broken lead line hs1 indicates the details of the VOB information #1 that corresponds to the VOB #1.

As indicated by the broken lead line hs1, the VOB information #1 includes: a "VOB identifier" that uniquely identifies a corresponding VOB; a "VOB recording date and time" at which the corresponding VOB is recorded; a "video encoding format" showing the compressed coding format of the video stream multiplexed with the VOB, an "audio encoding format" showing the compressed coding format of the audio stream multiplexed with the VOB; and a "time map" regarding the corresponding VOB.

The "time map" is a reference table to address the start of each VOB by indirect referencing by time information. By following the broken lead lines hs2 and hs3, the time map is shown in the figure in more and more details. As indicated by the broken lead line hs2, the time map is composed of pieces of entry information each corresponding to one of the VOBUs. Each piece of entry information is composed of, as indicated by the broken lead line hs3, "VOBU reproduction time" showing the time taken to reproduce the VOBU, and a "VOBU size" showing the data size of the VOBU. As the variable length compression coding is employed, each VOBU including GOPs may differ from each other in data size and reproduction time. Yet, with reference to the "entry information", it is possible to address the beginning of picture data included in a VOBU that corresponds to any reproduction time.

Now, description is given to the internal construction of the reproduction route information. The feature of the reproduction route information is found in its notation. To be more specific, since the management information includes the time map, the reproduction route information is described in the form of indirect referencing using the time map as the reference table. The reproduction route information is described in the form of indirect referencing in order to eliminate the load otherwise imposed by updating the reproduction route information every time the VOB is edited. Now, the reproduction route information is described in detail. As indicated by the broken lead line hs4, each piece of reproduction route information is composed of a plurality of pieces of cell information (cell information #1, #2, #3 . . . ). As indicated by the broken lead line hs6, each piece of cell information corresponds to one of the VOBs and is composed of: the "VOB identifier" identifying the VOB; "start location information" that is time information representing the location at which reproduction of the VOB starts; and the "end location information" that is time information representing the location at which reproduction of the VOB ends. The segment of which start location and end location are specified by the time information is referred to as a "cell" and the array of the pieces of cell information represents the reproduction order of the cells. The reproduction route described in the above notation are divided into the following two types: (1)one generated automatically by a recording apparatus at the time the recording apparatus records the VOB, and (2)one recorded in response to an editing operation inputted by a user. This is because VOBs may be reproduced via a variety of reproduction routes.

Figure 25:
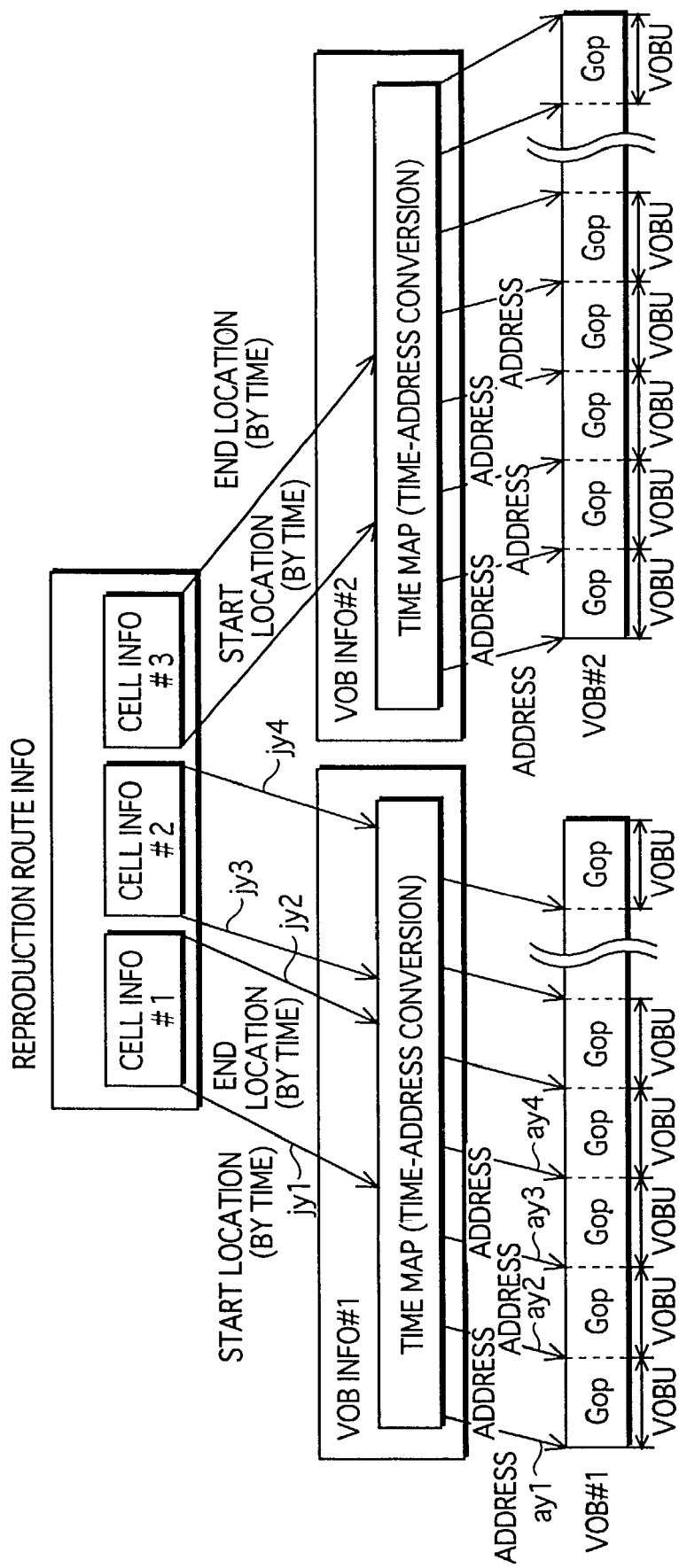
FIG. 25 is a view schematically showing indirect referencing by reproduction route information.

FIG. 25 is a view schematically showing the indirect referencing by the reproduction route information. In the figure, each of VOB#1 and VOB#2 is composed of a plurality of VOBUs, and each VOBU includes a GOP. The time map included in each piece of VOB information specifies sector addresses each corresponding to one of the GOPs as indicated by arrows ay1, ay2, ay3, and ay5. These sector addresses are indirectly referenced via the time map. The arrows jy1, jy2, jy3, and 4 in the figure schematically represent how a GOP is specified by the time information. That is, the time information addresses, via the time map, one of the GOPs included in the VOB (as represented by the arrows jy1, jy2, jy3, and jy4). The reproduction route information in the figure represents a reproduction route by the set of time information indicated by the arrows jy1, jy2, jy3 and jy4.

As apparent from FIG. 25, each content is composed of at least one VOB, reproduction route information specifying a reproduction route, and VOB information. Contents may be freely edited by changing the start location information and/or the end location information both included in the cell information, or by changing the array of pieces of the cell information included in the reproduction route information.

Now, description is given to the processing performed by the recording apparatus for recording the management file having the above construction and for backup processing of contents.

The recording controller 14 according to the embodiment 8 records, at the time of recording contents, the management file into the HD along with VOBs. The recording controller 14 then performs the processing to back up contents from the HD to a DVD according to the processing of the embodiment 3. In the embodiment 3, a certain size of free space is subtracted from the capacity of the DVD prior to the backup processing in order to preserve the free space for future recording of contents. In the embodiment 8, however, rather than to preserve a free space for such a purpose, the size corresponding to the management file is subtracted from the capacity of the DVD prior to the backup processing (It is also applicable to subtract the total size of the management file in addition to the free space to be preserved).

Consideration is now given to how to determine the size of a management file to be subtracted. In the present embodiment, each management file is considered to have a fixed size, and the fixed size is subtracted from the capacity of the DVD. The fixed size is set at the maximum size of a management file. That is, the size of a management file is estimated to be larger than it in most cases is, so as to allow for adequate margin. There is an upper limit set for a management file so that the size of the management file never exceeds the upper limit no matter how many contents are recorded. This is because a recording apparatus requires the management file to be resident for reproducing contents. If the management file may be unlimitedly larger, the recording apparatus is likely to fail to keep the management file resident.

After subtracting the file size of the management file as above, the drive controller 15 sequentially copies VOBs constituting a content from the HD to a DVD. In addition, the drive controller 15 generates a management file in the DVD and copies, from the management file stored in the HD, reproduction route information and VOB information corresponding to the content recorded in the DVD. In the case where the size of the management file generated in the DVD is extremely small relative to the size of the corresponding contents and thus regarded to be negligible, it is applicable to perform the calculations used in the backup processing by approximate calculation.

In the backup processing, in the case where the capacity of the DVD falls short to copy all the contents to be backed up, the drive controller 15 calculates a bit rate for re-encoding similarly to the embodiments 1-7. The drive controller 15 instructs the MPEG encoder 2 to perform encoding at the calculated bit rate. As a result of the encoding at this new bit rate, the data size of each VOBU is reduced. Accordingly, prior to being recorded in the DVD, the time map included in the VOB information is updated so that the data size of each VOBU is in consistent with the re-encoded size.

As described above, according to the present invention, when a content includes management information, a free space is preserved in a DVD for recording the management information. A bit rate for re-encoding is then calculated, and re-encoding is performed at the calculated bit rate. Thus, contents and other necessary information are recorded in the DVD in compliance with the DVD-Video Recording Standards.

Up to this point, the present invention has been described by way of the specific embodiments. Yet, these embodiments are given merely as examples of a system with which the best effect is likely to be achieved in the current circumstances. The present invention may be modified without departing from the gist. Exemplary modifications include the following modifications (A)-(J).

(A) The features of the drive controller 15, the bit rate calculator 16, and the GUI controller 17 described in the embodiment 1 are implemented by a improved computer-readable program as shown in the flowchart in FIGS. 3, 7, 8, 14, 15, 18, and 19. Thus, the program implementing the features may be embodied separately from an apparatus for performing the program. If the program is stored in a computer-readable recording medium, the program may be solely implemented through giving or lending the recording medium. Alternatively, if the program is distributed over a network, the program may be implemented through transmission of the program via the network.

(B) The embodiments 1-2 are based on that the recording medium (the first recording medium) for temporarily storing contents is an HD, and that the recording medium (the second recording medium) for recording backup copies is a DVD. Yet, this is merely one example, and any other types of recording medium may be the first and the second recording medium as long as the first recording medium has a greater capacity than that of the second recording medium. Examples of such recording mediums include non-DVD optical discs, such as CD-R, CD-RW, and magneto-optical discs such as PD, and MO. Further, the examples include semiconductor memory cards, such as compact flash cards, smart mediums, memory sticks, multimedia cards, PCM-CIA cards. Further, the examples include (i) magnetic recording disk such as flexible disks, Super Disks, and Zip Clik!, and (ii) removable hard disk drives, such as ORB, Jaz, Spar Q, SyJet, EZ Fley, and microdrives.

(C) In the embodiments 1 and 2, each content is composed of at least one VOB obtained by encoding analog video signals that have been analog-broadcasted. However, a content may be obtained by encoding analog/digital video signals that have been recorded in a video tape.

Alternatively, a content may be obtained by encoding analog/digital video signals captured by a video camera.

(D) Although the MPEG encoder 2 encodes contents with the MPEG 2 image compression/coding format, other image compression/coding format (e.g., MPEG 1 or MPEG 4) may be employed. Similarly, although the MPEG decoder 5 decodes contents with the MPEG 2 image decompression/decoding format, other image compression/coding format (e.g., MPEG 1 or MPEG 4) may be employed.

(E) In the above embodiments, contents are reduced by re-encoding the contents at a lower bit rate than the originally allocated bit rate. Yet, reduction of contents maybe achieved by altering the image compression/coding format for example from MPEG 2 to MPEG 4 or from MPEG 2 to MPEG 1. MPEG 1 is a format according to which a content is encoded at a coding bit rate of 1-1.5 Mbps, which is suitable for recording into a CD-ROM. MPEG 4 is a format according to which a content is encoded at a coding bit rate of 64-128 Kbps, which is suitable for displaying on a small-sized liquid crystal display of a cellular phone.

If a content is re-encoded with one of the above coding formats, the size of the content is greatly reduced. Unlike MPEG 2, however, these formats do not sufficiently support the image quality provided by TV broadcasting, and thus result in extremely degraded image quality. For the sake of image quality of the re-encoded contents, it is most preferable to re-encode a content, as shown the embodiments 1-7, at a lower bit rate so that the re-encoded content is reduced to an appropriate size to be recorded in the DVD.

(F) In the above embodiments, VOBs are multiplexed with a video stream and an audio stream. Yet, the VOBs may be additionally multiplexed with a sub-video stream corresponding to run-length decoded subtitles, or with other control information.

(G) When copy generation information (CGI) is embedded within a content, it is preferable to perform the backup processing from the HD to a DVD in compliance with the copy generation information. The copy generation information indicates one of the flowing states: "copy free" showing that the content can be freely copied; "one generation copy" showing that the content can copied only once; "no more copy" showing that the content is prohibited to be copied any more since the content itself is a duplicate of an original; and "never copy" showing that the content is prohibited to be copied on any condition. Thus, the backup of the content from the HD to a DVD is carried out only when the copy generation information indicates the "copy free" state or the "one generation copy", and the backup of the content is to be prohibited when the copy generation information indicates the "no more copy" sate or the "never copy" state.

(H) When rights management information is attached to a content, it is preferable to perform the backup processing from the HD to a DVD in compliance with the rights management information. For example, when the rights management information specifies a limited number of copying to be made, the backup processing of the content is performed only when the management information permits. In another example, when the rights management information limits a valid period within which the content is allowed to be copied, the backup of the content is performed only when the management information permits.

(I) Copying of a content may include various types of copying, such as "move", "migrate", and "check-out". In this case, each type of copying may be performed in compliance with usage condition that is separately determined for each type of copying. The move processing is a type of copying which involves deletion of the original content, and performed to move a content between two recording mediums.

The migrate processing is a type of copying which involves generation of usage condition information in a recording medium to which the content is copied.

The check-out processing is a type of copying allowed within a limited number of times. Thus, this type of copying is preceded by decrement of the limited number of times. The following are difference between the check-out processing and generally-referred copying with a limited number of times. That is, in the check-out processing, it is possible to increment the limited number of times. The increment is performed after disabling the content that has been copied to a recording medium (this disabling processing is referred to as "check-in").

(J) In the above embodiments, the description is given to an example to make backup copies of contents that are stored in the HD to a DVD. It is noted that the contents may be music contents, and the portable recording medium may be a semiconductor memory card. Comparing with an HD, a semiconductor memory card is smaller in capacity. Thus, it is likely that the capacity of a semiconductor memory card fall short to copy a plurality of contents from the HD. In such a case, contents are re-encoded to reduce the size prior to being recorded in the semiconductor memory card. If the contents have been compression encoded by a compression coding format, such as MP3 (MPEG LAYER 3), or MPEG-AAC (Advanced Audio), the bit rate to be allocated is variable on each audio frame. Thus, when the capacity of the semiconductor memory card falls short to copy the contents, one or more of the contents are re-encoded. Here, as described in the embodiment, the re-encoding is performed at a bit rate that is so calculated that the resulting contents will be an appropriate size to be recorded in the semiconductor memory card. As a result, the contents stored in the HD are recorded in the semiconductor memory card.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording apparatus for copying a plurality of contents stored in a first recording medium to a second recording medium, the recording apparatus comprising:

a selecting unit operable to select, in accordance with a user operation, one or more contents to be copied from the first recording medium to the second recording medium;

a receiving unit operable to receive a user instruction designating one or more contents, out of the selected contents, to be copied without changing a current bit rate;

a first duplicating unit operable to copy, to the second recording medium, each designated content without changing the current bit rate; and a second duplicating unit operable to copy, to the second recording medium, one or more contents remaining non-designated, by re-encoding to reduce a size thereof, wherein a bit rate allocated to each content by re-encoding is calculated using a total reproduction time of the non-designated contents and a residual free capacity remaining after subtracting, from an effective free capacity of the second recording medium, a total size of the contents to be copied by the first duplicating unit.

2. The recording apparatus of claim 1, further comprising:

a content size calculating unit operable to calculate a total size of the non-designated contents by subtracting, from a total size of the selected contents, the total size of the contents to be copied by the first duplicating unit;

a residual capacity calculating unit operable to calculate the residual free capacity remaining after subtracting, from the free capacity of the second recording medium, the total size of the contents to be copied by the first duplicating unit;

a bit rate calculating unit operable to calculate a reference bit rate, using (i) the total size of the non-designated contents, (ii) a reproduction time of each non-designated content, and (iii) a current bit rate of each non-designated content; and a judging unit operable to judge whether each non-designated content needs to be re-encoded, by comparing the reference bit rate and the current bit rate of the non-designated content, wherein each non-designated content is re-encoded if a current bit rate of the non-designated content is lower than the reference bit rate.

3. The recording apparatus of claim 2, wherein the plurality of contents selected by the selecting unit are written in the following order: (1) contents to be copied without changing the current bit rate, (2) contents of which current bit rate is lower than the reference bit rate, and (3) contents of which current bit rate is higher than the reference bit rate.

4. The recording apparatus of claim 1, further comprising:

a content size calculating unit operable to calculate a total size of the non-designated contents by subtracting, from a total size of the selected contents, the total size of the contents to be copied by the first duplicating unit;

a residual capacity calculating unit operable to calculate the residual free capacity remaining after subtracting, from the effective free capacity of the second recording medium, the total size of the contents to be copied by the first duplicating unit; and a size reduction ratio calculating unit operable to calculate a size reduction ratio using the total size of the non-designated contents and the residual free capacity of the second recording medium, wherein the bit rate allocated to each content by re-encoding is calculated by multiplying the current bit rate by the size reduction ratio.

5. The recording apparatus of claim 1, further comprising:

a detecting unit operable to detect a bit rate allocated to each content stored in the first recording medium; and a display unit operable to display, for each non-designated content, a degradation ratio between the detected bit rate and the bit rate to be allocated by re-encoding, wherein the receiving unit is further operable to receive, after the display is presented, a user instruction instructing whether to perform re-encoding of each non-designated content, and the second duplicating unit is operable to re-encode the content of which re-encoding is instructed.

6. The recording apparatus of claim 1, further comprising:

a display unit operable to display, for each non-designated content, a reproduction time of the content as a time required for re-encoding the content, wherein the receiving unit is further operable to receive, after the display is presented, a user instruction instructing whether to perform re-encoding of each non-designated content, and the second duplicating unit re-encodes the content of which re-encoding is instructed.

7. The recording apparatus of claim 1, wherein the receiving unit is further operable to receive a user input designating a space size to be reserved in the second recording medium, and the free capacity of the second recording medium is calculated by subtracting the designated space size in advance.

8. A computer-readable medium storing a program for causing a computer to copy a plurality of contents stored in a first recording medium to a second recording medium, said program comprising code causing the computer to perform a method comprising:

a selecting step of selecting, in accordance with a user operation, one or more contents to be copied from the first recording medium to the second recording medium;

a receiving step of receiving a user instruction designating one or more contents, out of the selected contents, to be copied without changing a current bit rate;

a first duplicating step of copying, to the second recording medium, each designated content without changing the current bit rate; and a second duplicating step of copying, to the second recording medium, one or more contents remaining non-designated, by re-encoding to reduce a size thereof, wherein a bit rate allocated to each content by re-encoding is calculated using a total reproduction time of the non-designated contents and a residual free capacity remaining after subtracting, from an effective free capacity of the second recording medium, a total size of the contents to be copied in the first duplicating step.

9. The computer-readable medium storing the program of claim 8, said program further comprising code operable to cause the computer to perform:

a content size calculating step of calculating a total size of the non-designated contents by subtracting, from a total size of the selected contents, the total size of the contents to be copied in the first duplicating step;

a residual capacity calculating step of calculating the residual free capacity remaining after subtracting, from the free capacity of the second recording medium, the total size of the contents to be copied in the first duplicating step;

a bit rate calculating step of calculating a reference bit rate, using (i) the total size of the non-designated contents, (ii) a reproduction time of each non-designated content, and (iii) a current bit rate of each non-designated content; and a judging step of judging whether each non-designated content needs to be re-encoded, by comparing the reference bit rate and the current bit rate of the non-designated content, wherein each non-designated content is re-encoded if a current bit rate of the non-designated content is lower than the reference bit rate.

10. The computer-readable medium storing the program of claim 9, wherein the plurality of contents selected in the selecting step are written in the following order: (1) contents to be copied without changing the current bit rate, (2) contents of which current bit rate is lower than the reference bit rate, and (3) contents of which current bit rate is higher than the reference bit rate.

11. The computer-readable medium storing the program of claim 8, said program further comprising code operable to cause the computer to perform:

a content size calculating step of calculating a total size of the non-designated contents by subtracting, from a total size of the selected contents, the total size of the contents to be copied in the first duplicating step;

a residual capacity calculating step of calculating the residual free capacity remaining after subtracting, from the effective free capacity of the second recording medium, the total size of the contents to be copied in the first duplicating step; and a size reduction ratio calculating step of calculating a size reduction ratio using the total size of the non-designated contents and the residual free capacity of the second recording medium, wherein the bit rate allocated to each content by re-encoding is calculated by multiplying the current bit rate by the size reduction ratio.

12. The computer-readable medium storing the program of claim 8, said program further comprising code operable to cause the computer to perform:

a detecting step of detecting a bit rate allocated to each content stored in the first recording medium; and a display step of displaying, for each non-designated content, a degradation ratio between the detected bit rate and the bit rate to be allocated at the time of re-encoding, wherein in the receiving step, a user instruction instructing whether to perform re-encoding of each non-designated content is further received after the display is presented, and in the second duplicating step, the content of which re-encoding is instructed is re-encoded.

13. The computer-readable medium storing the program of claim 8, said program further comprising code operable to cause the computer to perform:

a display step of displaying, for each non-designated content, a reproduction time of the content as a rime required for re-encoding the content, wherein in the receiving step, a user instruction instructing whether to perform re-encoding of each non-designated content is further received after the display is presented, and in the second duplicating step, the content of which re-encoding is instructed is re-encoded.

14. The computer-readable medium storing the program of claim 8, wherein in the receiving step, a user input designating a space size to be reserved in the second recording medium is further received, and the free capacity of the second recording medium is calculated by subtracting the designated space size in advance.

* * * * *